(12) United States Patent
Ueyama et al.

(10) Patent No.: US 7,699,200 B2
(45) Date of Patent: Apr. 20, 2010

(54) SCRIBING AND BREAKING APPARATUS AND SYSTEM THEREFOR

(75) Inventors: Hiroki Ueyama, Osaka (JP); Akira Ejimatani, Osaka (JP)

(73) Assignee: Mitsuboshi Diamond Industrial Col., Ltd., Suita (JP)

( * ) Notice: Subject to any disclaimer, the term of this patent is extended or adjusted under 35 U.S.C. 154(b) by 0 days.

(21) Appl. No.: 12/274,442

(22) Filed: Nov. 20, 2008

(65) Prior Publication Data

US 2009/0071995 A1  Mar. 19, 2009

Related U.S. Application Data

(62) Division of application No. 11/538,140, filed on Oct. 3, 2006, which is a division of application No. 10/450,877, filed on Jun. 17, 2003, now Pat. No. 7,131,562.

(51) Int. Cl.
*B26F 3/00* (2006.01)
(52) U.S. Cl. .................................. 225/96.5; 225/103
(58) Field of Classification Search ............... 225/96, 225/96.5, 5, 103
See application file for complete search history.

(56) References Cited

U.S. PATENT DOCUMENTS

| | | | |
|---|---|---|---|
| 3,274,390 A | | 9/1966 | Umbel |
| 3,424,357 A | | 1/1969 | Huffman et al. |
| 3,490,503 A | * | 1/1970 | Hill et al. .................. 144/353 |
| 3,532,260 A | * | 10/1970 | Augustin et al. ............ 225/2 |
| 3,779,437 A | | 12/1973 | Yamamoto et al. |
| 4,018,372 A | * | 4/1977 | Insolio .................... 225/2 |
| 4,049,167 A | * | 9/1977 | Guissard .................. 225/2 |
| 4,076,159 A | * | 2/1978 | Farragher ................. 225/3 |
| 4,454,972 A | | 6/1984 | Maltby et al. |
| 4,558,622 A | | 12/1985 | Tausheck |
| 4,739,555 A | | 4/1988 | Jurgens |
| 5,671,527 A | | 9/1997 | Asai et al. |
| 6,276,355 B1 | | 8/2001 | Zhang et al. |
| 6,408,527 B1 | | 6/2002 | Chubb |
| 6,421,456 B1 | | 7/2002 | Son et al. |
| 6,470,782 B1 | | 10/2002 | Shimotoyodome et al. |
| 6,774,978 B2 | | 8/2004 | Shin |

FOREIGN PATENT DOCUMENTS

EP    0 217 658 A1    4/1997

(Continued)

OTHER PUBLICATIONS

Korean Office Action corresponding to Application No. 519980662758 dated May 23, 2006.

*Primary Examiner*—Kenneth E Peterson
(74) *Attorney, Agent, or Firm*—Renner, Otto, Boisselle & Sklar, LLP

(57) ABSTRACT

A separation apparatus comprising a first and a second scribing devices for scribing front and rear surfaces of a first mother substrate made of a brittle material along first predetermined scribing lines previously provided on the front and rear surfaces of the first mother substrate, the first and second scribing devices being opposed to each other on an upper side and a lower side, and a holding and transferring device for holding and transferring the first mother substrate so that the first predetermined scribing lines of the first mother substrate are located between the first and second scribing devices.

1 Claim, 29 Drawing Sheets

Scribing direction

FOREIGN PATENT DOCUMENTS

| | | |
|---|---|---|
| JP | 09-278473 | 10/1997 |
| JP | 10-209086 | 8/1998 |
| JP | 10-338534 | 12/1998 |
| JP | 11-116260 | 4/1999 |
| JP | 2000-119030 | 4/2000 |
| JP | 2000-247667 | 9/2000 |
| JP | 2001-163642 | 6/2001 |
| JP | 2000-264657 | 9/2001 |
| KR | 1999-0053079 | 7/1999 |

\* cited by examiner

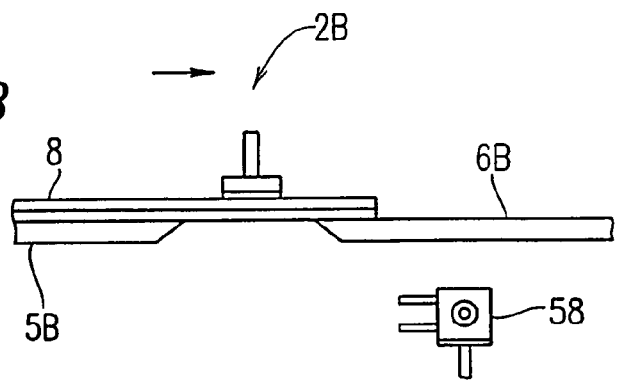
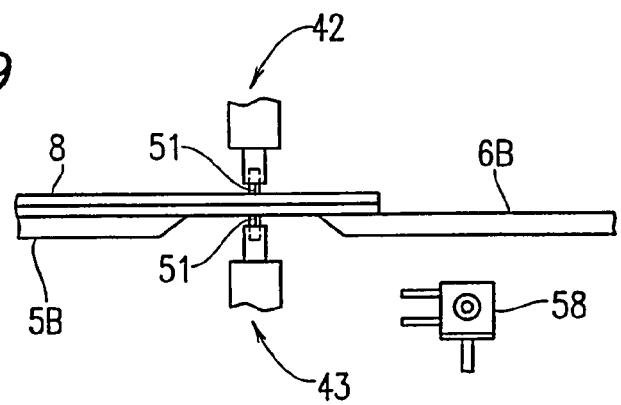
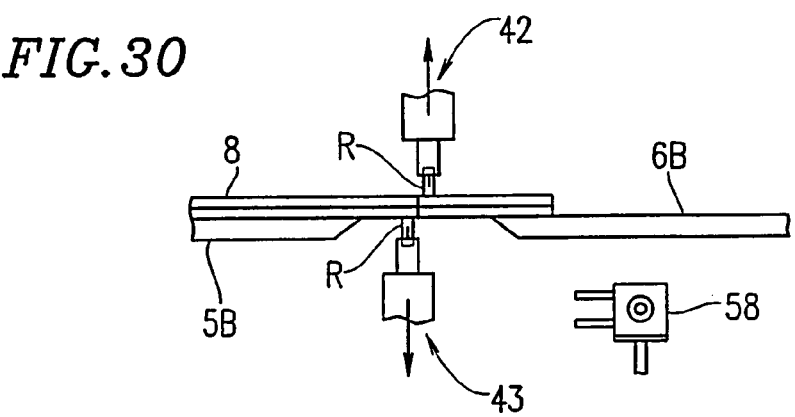
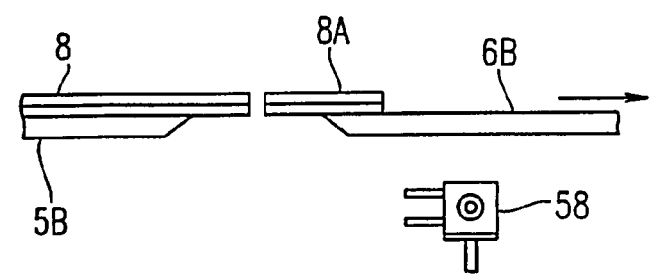

FIG. 40
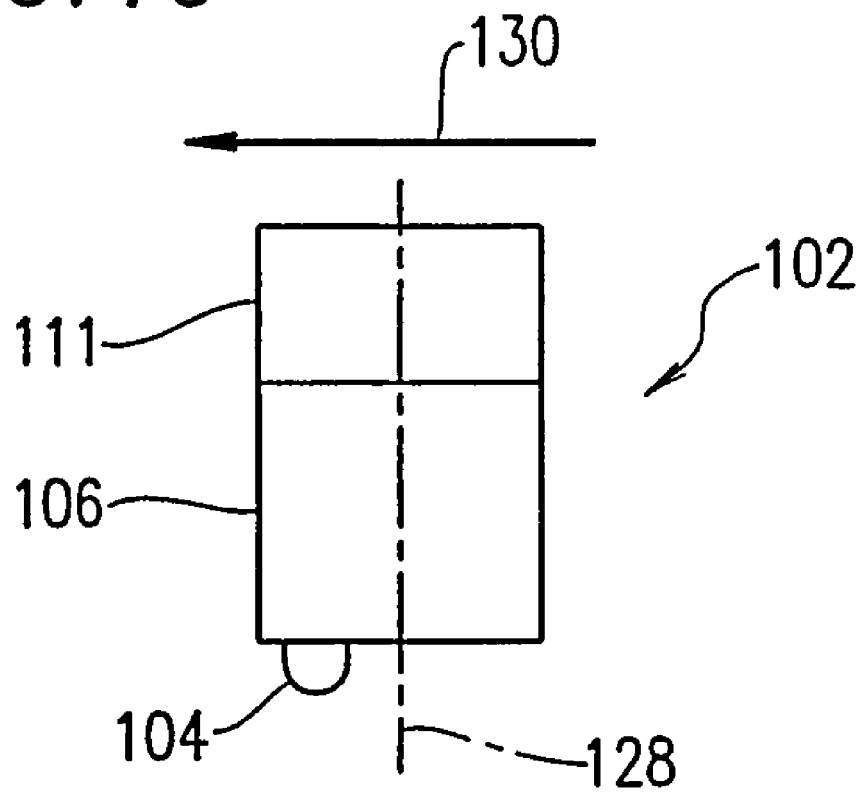
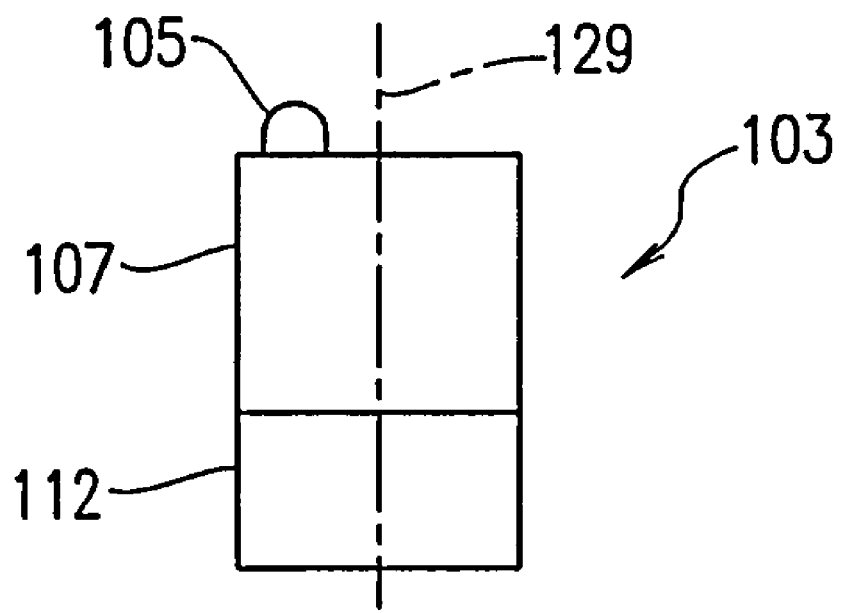

SCRIBING AND BREAKING APPARATUS AND SYSTEM THEREFOR

This application is a divisional of U.S. patent application Ser. No. 11/538,140 filed on Oct. 3, 2006, which is a divisional of U.S. patent application Ser. No. 10/450,877 filed on Jun. 17, 2003, now U.S. Pat. No. 7,131,562, which are hereby incorporated herein by reference in their entirety.

TECHNICAL FIELD

The present invention relates to a scribing and breaking apparatus for scribing and breaking two brittle material substrates bonded together by scribing along a predetermined scribing line.

BACKGROUND ART

Two brittle material substrates bonded together referred to as "bonded brittle material substrate" in the present specification, includes a flat display panel such as liquid crystal display comprising two glass substrates bonded together, a plasma display panel, and an organic EL display panel, and the like, and a bonded semiconductor substrate comprising a glass substrate bonded with a silicon substrate, a sapphire substrate, or the like. Hereinafter, a bonded brittle material substrate comprising two brittle material substrates bonded together will be described by exemplifying a liquid crystal panel. Cutting of brittle materials is made by scribing and breaking, and such cutting is hereinafter referred to as separation of brittle materials.

FIG. 45 is a block diagram showing a conventional liquid crystal panel separation line 900. The liquid crystal panel separation line 900 comprises a scribing apparatus 901. FIG. 46 is a perspective view showing the scribing apparatus 901. The scribing apparatus 901 comprises a table 905. A liquid crystal mother panel 908 is placed on the table 905. The table 905 is provided that it can be moved in a direction Y1 and rotated in a direction θ1. The liquid crystal mother panel 908 comprises two glass substrates bonded together.

The scribing apparatus 901 comprises a scribing head 811 for scribing the surface of the upper glass substrate (hereinafter also referred to as an "A-side substrate") of two glass substrates constituting the liquid crystal mother panel 908 placed on the table 905, and is provided so that the scribing head 811 can be slid in a direction X1. A chip holder 806 is attached to the scribing head 811. A cutter wheel chip 804 for scribing the liquid crystal mother panel 908 along a predetermined scribing line S, is rotatively supported at a lower end of the chip holder 806. A motor 812 for driving the scribing head 811 in the direction X1 is provided in the scribing apparatus 901. The scribing apparatus 901 further comprises a CCD camera 929 and a monitor 930. The CCD camera 929 recognizes alignment marks provided on the liquid crystal mother panel 908 so as to position the liquid crystal mother panel 908. The monitor 930 displays the alignment marks recognized by the CCD camera 929.

A breaking apparatus 902 is provided on the side of downstream of the scribing apparatus 901. FIG. 47 is a perspective view showing the breaking apparatus 902. The breaking apparatus 902 comprises a table 917. The liquid crystal mother panel 908 is placed on the table 917 in such a manner that the A-side substrate is positioned on the lower side. The table 917 can be moved in a direction Y2 and rotated in a direction θ2. The breaking apparatus 902 comprises a breaking bar 919 for separating the A-side substrate along a scribing line provided thereon. The breaking bar 919 is provided to the table 917 in such a manner that the breaking bar 919 can be moved upward and downward over the liquid crystal mother panel 908. A hard rubber member 920 having a V-shaped section is attached to the lower side of the breaking bar 919.

A scribing apparatus 901A is placed on the side of downstream of the breaking apparatus 902. The scribing apparatus 901A has the same configuration as that of the scribing apparatus 901, and scribes the other substrate of the two glass substrates constituting the liquid crystal mother panel 908, opposite to the A-side substrate (hereinafter also referred to as a "B-side substrate").

A breaking apparatus 902A is placed on the side of downstream of the scribing apparatus 901A. The breaking apparatus 902A has the same configuration as that of the breaking apparatus 902, and breaks the B-side substrate along a scribing line provided thereon.

FIG. 48 is a plan view showing the conventional liquid crystal mother panel 908. FIG. 49 is a perspective view showing a liquid crystal panel 909 separated from the liquid crystal mother panel 908. The liquid crystal mother panel 908 is divided into six liquid crystal panels 909 in a matrix of 3×2. Terminals 913 are provided on two edges of the lower-side glass substrate of the two glass substrates constituting the liquid crystal panel 909. A seal 911 is provided between the two glass substrates constituting the liquid crystal mother panel 908. Liquid crystal is poured into a gap between the two glass substrates sealed by the seal 911 through an inlet 914.

FIG. 50 is a plan view for explaining an adhesive seal 915 provided on the liquid crystal mother panel 908. The adhesive seal 915 is provided on a peripheral portion of the liquid crystal mother panel 908 and between each seal 911 so as to prevent scattering of substrate fragments, which are generated when separating the liquid crystal mother panel 908.

The operation of the thus-constructed liquid crystal panel separation line 900 will be described below. FIG. 51 is a front view for explaining the operation of the conventional scribing apparatus 901. FIG. 52 is a front view for explaining the operation of the conventional breaking apparatus 902. FIG. 53 is a front view for explaining the operation of the scribing apparatus 901A. FIG. 54 is a front view for explaining the operation of the breaking apparatus 902A.

Referring to FIGS. 45, 46 and 51, in the scribing apparatus 901, when the liquid crystal mother panel 908 is placed on the table 905 by a feeding mechanism (not shown) in such a manner that the A-side substrate 910 is positioned on the upper side, a scribing line S1 is formed on the A-side substrate 910 by the cutter wheel chip 804.

Referring to FIGS. 45, 47 and 52, the liquid crystal mother panel 908, A-side substrate 910 of which has been scribed by the scribing apparatus 901, is turned upside down by an inverting mechanism (not shown), and is placed on the table 917 of the breaking apparatus 902 in such a manner that the A-side substrate 910 is positioned on the lower side. Thereafter, the breaking bar 919 is moved downward to press the B-side substrate 912 in a position which is along the scribing line S1, thereby separating the A-side substrate 910 along the scribing line S1.

Referring to FIGS. 45, 46 and 53, the liquid crystal mother panel 908, A-side substrate 910 of which has been separated by the breaking apparatus 902, is transferred by a transferring mechanism (not shown), and is placed on the table 905 of the scribing apparatus 901A in such a manner that the A-side substrate 910 is positioned on the lower side. Substrate pieces 916 which have been separated by the breaking apparatus 902 are placed on the table 905 along with the liquid crystal mother panel 908, since the substrate fragments 916 are adhered to the B-side substrate 912 by the adhesive seal 915. In the scribing apparatus 901A, a scribing line S2 is formed on the B-side substrate 912 by the cutter wheel chip 804.

Referring to FIGS. 45, 47 and 54, the liquid crystal mother panel 908, B-side substrate 912 of which has been scribed by the scribing apparatus 901A, is turned upside down by an inverting mechanism (not shown), and is placed on the table 917 of the breaking apparatus 902A in such a manner that the B-side substrate 912 is positioned on the lower side. Thereafter, the breaking bar 919 of the breaking apparatus 902A is moved downward to press the A-side substrate 910 in a position which is along the scribing line S2 so that the B-side substrate 912 is separated along the scribing line S2. The resultant substrate fragments adhered together by the adhesive seal 915, are then removed together.

FIG. 55 is a diagram showing a configuration of another conventional scribing apparatus 950. The scribing apparatus 950 comprises a table 951, and both ends of the liquid crystal mother panel 908 are placed thereon. A fixing member 952 for fixing the liquid crystal mother panel 908, is attached to the table 951. The scribing apparatus 950 comprises a pair of cutter heads 953 and 954 which sandwich the liquid crystal mother panel 908 vertically.

In the thus-constructed scribing apparatus 950, when the liquid crystal mother panel 908 is fixed on the table 951 by the fixing member 952, the upper and lower surfaces of the liquid crystal mother panel 908 are simultaneously scribed by the respective cutter heads 953 and 954.

In the liquid crystal panel separation line 900 described above with reference to FIGS. 45 through 54, each side of the liquid crystal mother panel 908 has to be scribed and broken at different times. Therefore, processing time is long and an area occupied by the apparatus is large.

Further, the liquid crystal mother panel 908 has to be turned upside down after scribing, so that the positioning of the liquid crystal mother panel 908 is required again.

Moreover, in order to prevent a situation that some substrate fragments 916 generated by the separation of the A-side substrate 910 by the breaking apparatus 902, might be removed not completely or might be dropped during the transfer, which is likely to cause troubles in the production line, the adhesive seal 915 for adhering pairs of the two glass substrates together, has to be provided between each pair of the two glass substrates. Therefore, extra steps are required for preparing the liquid crystal mother panel 908 itself. Further, the amount of a material for the seal is increased, thereby leading to an increase in cost for the liquid crystal mother panel 908.

In the scribing apparatus 950 described above with reference to FIG. 55, a breaking apparatus is additionally required for separating the liquid crystal mother panel 908 scribed by the scribing apparatus 950. Further, an inverting apparatus is still additionally required for inverting the liquid crystal mother panel 908 scribed by the scribing apparatus 950 and feeding it to the breaking apparatus.

An object of the present invention is to provide a separation apparatus and production line capable of reducing a processing time for separating a mother panel.

Another object of the present invention is to provide a separation apparatus and production line having a small footprint (i.e., occupying a small area).

Still another object of the present invention is to provide a separation apparatus and a production line capable of separating a mother panel without requiring the provision of an adhesive seal.

DISCLOSURE OF THE INVENTION

A separation apparatus according to the present invention comprises a first and a second scribing means for scribing upper and lower surfaces of a mother substrate made of a brittle material along respective predetermined scribing lines, the first and second scribing means being opposed to each other on an upper side and a lower side, and a holding and transferring means for holding and transferring the mother substrate so that the scribing lines of the mother substrate are located between the first and second scribing means, thereby achieving the above-described objects.

The holding and transferring means may transfer the mother substrate so that the mother substrate can be passed between the first and second scribing means.

The holding and transferring means may hold and transfer the mother substrate while sucking.

The holding and transferring means may transfer the mother substrate while holding an end thereof.

The mother substrate may comprise a first and a second glass substrates bonded together. The first glass substrate may be scribed by the first scribing means. The second glass substrate may be scribed by the second scribing means.

The mother substrate may be a liquid crystal mother panel. Only a seal for sealing liquid crystal is provided between the first and second glass substrates.

The separation apparatus may further comprise a first table. The mother substrate may be placed on the first table while the mother substrate may be transferred between the first and second scribing means by the holding and transferring means. The first and second scribing means may be provided on one side of the first table.

The separation apparatus may further comprise a second table. The first and second scribing means may be provided between the first and second tables. The mother substrate may be placed across the first and second tables by the holding and transferring means.

The separation apparatus may further comprise a removing means for removing substrate fragments separated from the mother substrate by at least one of the first and second scribing means.

The first and second scribing means may have a first and a second rollers, respectively, and the first and second rollers roll on the mother substrate while exerting a predetermined pressure on the mother substrate so that the mother substrate is separated along the scribing lines provided by the first and second means.

The first and second rollers may roll on the mother substrate in such a manner as to exert a bending moment around the scribing line on the mother substrate.

The first and second rollers may roll on surfaces of the mother substrate opposite to each other with respect to the scribing line.

The separation apparatus may further comprise a table for placement of the mother substrate. The table may be provided with a roller for guiding the mother substrate transferred by the holding and transferring means.

The first and second scribing means may have a first and a second cutter wheel chips for scribing the mother substrate, respectively. Blades of the first and second cutter wheel chips may be different from each other.

The separation apparatus may further comprise a table having a cut portion having a width larger than a width of the mother substrate. The second scribing means may be disposed in the cut portion so that a rear surface of the mother substrate across the cut portion can be scribed by the second scribing means. The first scribing means may be disposed so that a front surface of the mother substrate across the cut portion can be scribed.

A separation system according to the present invention comprises at least a first separation apparatus and at least a second separation apparatus. The first separation apparatus includes a first and a second scribing means for scribing front and rear surfaces of a first mother substrate made of a brittle material along first predetermined scribing lines previously provided on the front and rear surfaces of the first mother substrate, the first and second scribing means being opposed to each other on an upper side and a lower side thereof, and a first holding and transferring means for holding and transferring the first mother substrate so that the first predetermined scribing lines of the first mother substrate are located between the first and second scribing means. The second separation apparatus includes a third and a fourth scribing means for scribing the front and rear surfaces of a second mother substrate separated from the first mother substrate by the first separation apparatus, along second predetermined scribing lines previously provided on the front and rear surfaces of the second mother substrate and crossing the first predetermined scribing lines, the third and fourth scribing means being opposed to each other on an upper side and a lower sides, and a second holding and transferring means for holding and transferring the second mother substrate so that the second predetermined scribing lines of the second mother substrate are located between the third and fourth scribing means, thereby achieving the above-described objects.

BRIEF DESCRIPTION OF THE DRAWINGS

FIGS. 20 through 35 are front views for explaining an operation of the liquid crystal panel separation apparatus of Embodiment 2.

FIG. 40 is a front view for explaining a first and a second cutter wheel chips respectively provided in a first and a second scribing mechanisms of Embodiment 3.

BEST MODE FOR CARRYING OUT THE INVENTION

Embodiment 1

Figure 1:
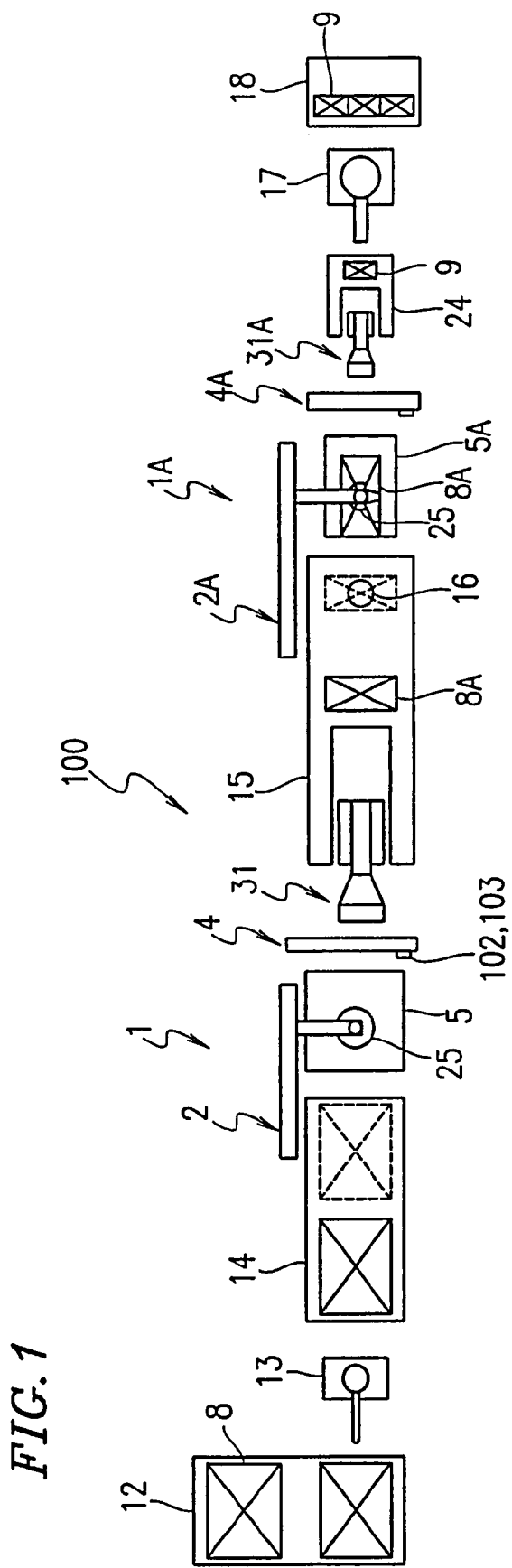
FIG. 1 is a plan view showing a liquid crystal panel separation line according to Embodiment 1 of the present invention.

A liquid crystal panel separation production line according to Embodiment 1 of the present invention separates a liquid crystal mother panel into liquid crystal panels. FIG. 1 is a plan view showing a liquid crystal panel separation production line 100 according to Embodiment 1 of the present invention. The liquid crystal panel separation production line 100 comprises a loader 12 which stocks liquid crystal mother panels 8. The liquid crystal panel separation production line 100 is provided with a feeding robot 13. The feeding robot 13 sucks and holds one by one the liquid crystal mother panels 8 stocked in the loader 12, and places it on a conveyer 14. The liquid crystal mother panel 8 placed on the conveyer 14 is transferred to the front side of the liquid crystal panel separation production line 100 (toward the right in FIG. 1), and is then positioned.

Figure 2:
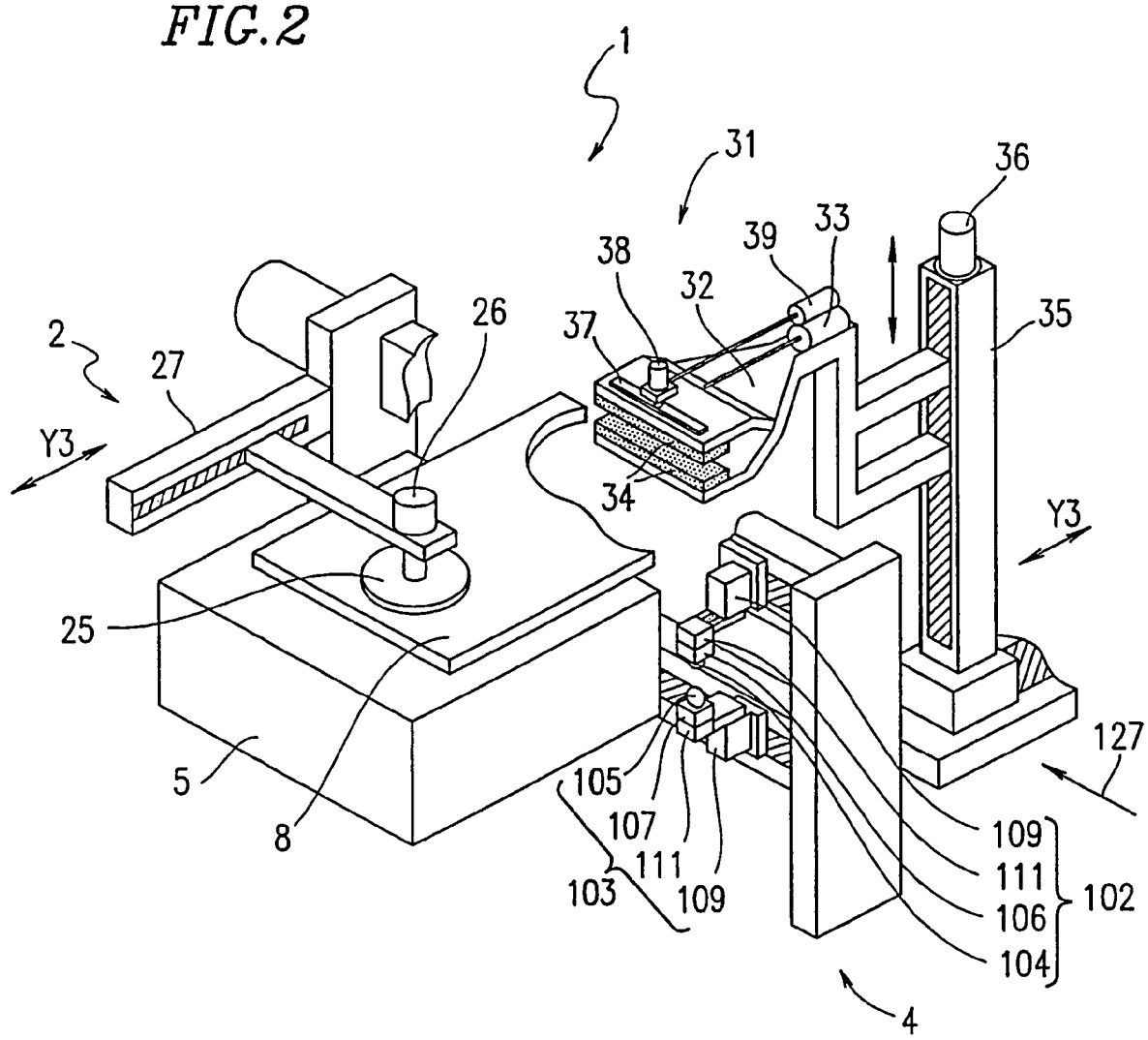
FIG. 2 is a perspective view for explaining the liquid crystal panel separation apparatus of Embodiment 1.
Figure 3:
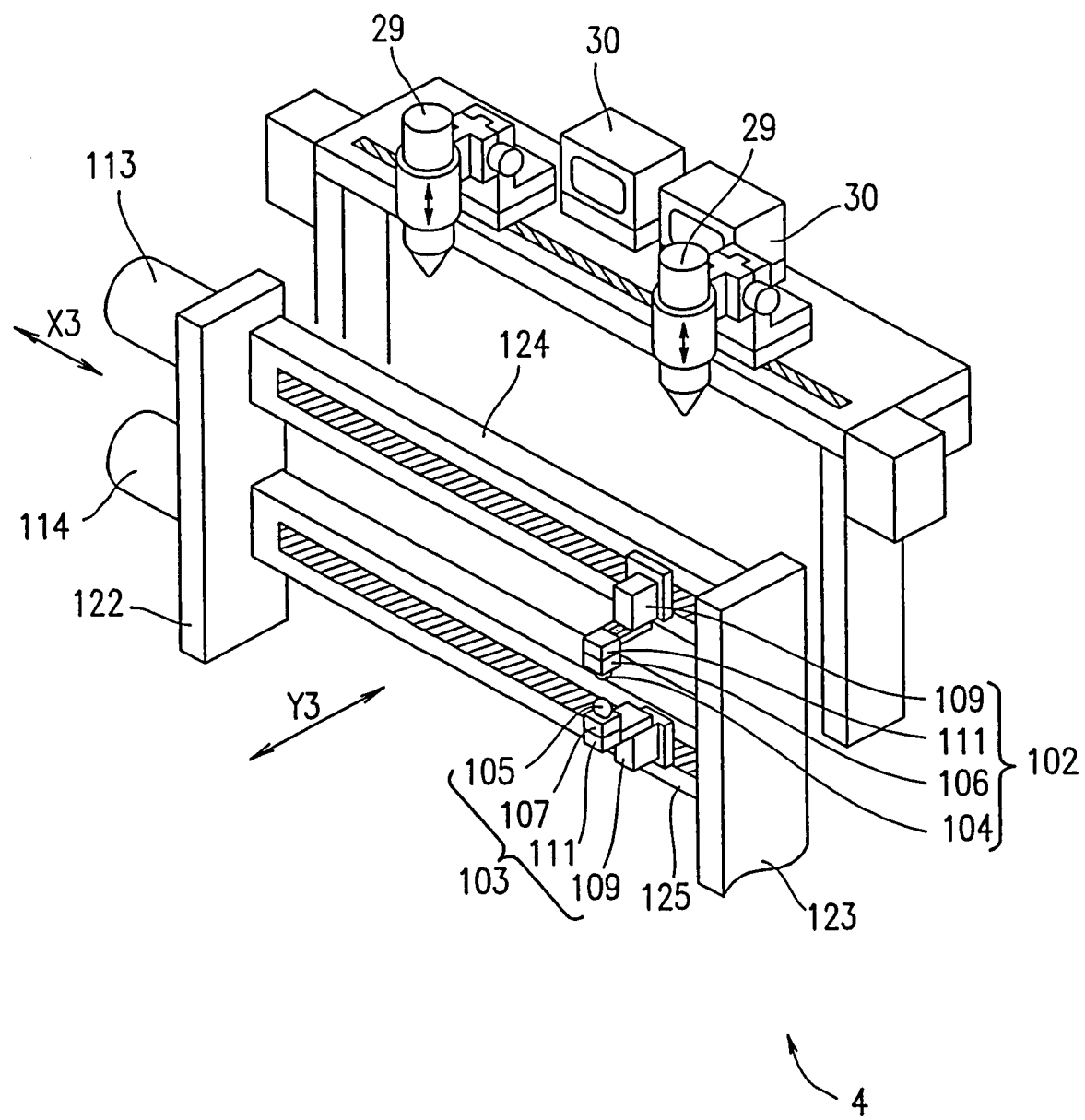
FIG. 3 is a perspective view showing a major part of the liquid crystal panel separation apparatus of FIG. 2.

The liquid crystal panel separation production line 100 comprises a liquid crystal panel separation apparatus 1. FIG. 2 is a perspective view for explaining the liquid crystal panel separation apparatus 1. FIG. 3 is a perspective view showing a major part of the liquid crystal panel separation apparatus 1 of FIG. 2. The liquid crystal panel separation apparatus 1 comprises a table 5, and the liquid crystal mother panel 8 is placed thereon. The liquid crystal panel separation apparatus 1 is provided with a suction transferring mechanism 2. The suction transferring mechanism 2 sucks and holds the liquid crystal mother panel 8 placed and positioned on the conveyer 14, and places it on the table 5. The suction transferring mechanism 2 has a guide 27 provided along a horizontal direction indicated by an arrow Y3. The guide 27 is provided with an arm which can be slid in a horizontal direction. A suction pad 25 for sucking and holding the liquid crystal mother panel 8 and a cylinder 26 for driving the suction pad 25 in an upward and a downward directions, are provided at the tip of the arm.

Referring to FIG. 3, the liquid crystal panel separation apparatus 1 comprises a scribing mechanism 4 for scribing the liquid crystal mother panel 8. The scribing mechanism 4 is provided on a side opposite to the conveyer 14 with respect to the table 5. The scribing mechanism 4 has a pair of supporting posts 122 and 123. The pair of supporting posts 122 and 123 are provided with guide bars 124 and 125 for sandwiching on the front and rear sides of the liquid crystal mother panel 8, which has been transferred by the suction transferring mechanism 2, and one end thereof juts out from the table 5.

The guide bar 124 is provided with a scribing portion 102, which can be slid in a direction indicated by an arrow X3, for scribing the surface of the liquid crystal mother panel 8. The guide bar 125 is provided with a scribing portion 103, which can be slid while facing the scribing portion 102 in a direction indicated by the arrow X3, for scribing the rear surface of the liquid crystal mother panel 8. Motors 113 and 114 for respectively sliding the scribing portions 102 and 103 in the direction indicated by the arrow X3, are attached to the supporting post 122.

The scribing portion 102 has a moving member 109 which can be slid in the direction indicated by the arrow X3. A scribing head 111 is provided on the lower side of the moving member 109 in such a manner that the scribing head 111 can be slid in a direction indicated by an arrow Y3. A chip holder 106 is provided on the lower side of the scribing head 111. A cutter wheel chip 104 is provided on the lower end of the chip holder 106 in such a manner that the cutter wheel chip 104 can be rotated.

The scribing portion 103 has the same configuration as that of the above-described scribing portion 102, and is provided so as to be opposed to the scribing portion 102. The scribing portion 103 has a moving member 109 which is provided in such a manner that it can be slid in the direction indicated by the arrow X3. A scribing head 111 is provided on the upper side of the moving member 109 in such a manner that the scribing head 111 can be slid in the direction indicated by the arrow Y3. A chip holder 107 is provided on the upper side of the scribing head 111. A cutter wheel chip 105 is provided on the upper end of the chip holder 107 in such a manner that the cutter wheel chip 105 can be rotated.

The liquid crystal panel separation apparatus 1 comprises CCD cameras 29 and monitors 30. The CCD cameras 29 recognize alignment marks provided on the liquid crystal mother panel 8. The monitors 30 display the alignment marks recognized by the CCD cameras 29.

Since the scribing head 111 can be slid in the direction indicated by the arrow Y3, the scribing position of the scribing portion 102 may be different from the scribing position of the scribing portion 103 in scribing the liquid crystal mother panel 8. Further, the centers of the alignment marks provided on the liquid crystal mother panel 8 are calculated by processing images captured by the CCD cameras 29. In case that the liquid crystal mother panel 8 installed on the table 5 is skewed, an obliquely deviated angle of the liquid crystal mother panel 8, and a point of the liquid crystal mother panel 8 where the cutter wheel chips 104 and 105 provided on the respective scribing portions 102 and 103 start cutting, are obtained by calculation. Scribing is performed so as to cancel the deviation of the liquid crystal mother panel 8, while the scribing heads 111 provided on the respective scribing portions 102 and 103, are moved in the direction indicated by the arrow Y3. Such a scribing method is called as scribing by a linear interpolation method. In Embodiments 2 and 3 to be described below, scribing is similarly performed by using the linear interpolation.

Such image processing and calculation are preferably performed for each scribing operation. If precision is not required for separating the liquid crystal mother panel 8, or if the liquid crystal mother panel 8 can be installed on the table 5 by the suction and transferring mechanism 2 with a high degree of precision, image processing and calculation are conducted only when the liquid crystal mother panel 8 is initially installed.

Referring again to FIG. 2, the liquid crystal panel separation apparatus 1 comprises a capturing mechanism 31. The capturing mechanism 31 holds the end of the liquid crystal mother panel 8 jutting out from the upper side of the table 5 in a grab-like manner. The capturing mechanism 31 is provided with a capturing portion 32 which has a substantially Y-shaped side viewed in a direction indicated by an arrow 127 in FIG. 2. The capturing portion 32 can be opened or closed by movement of a cylinder 33, and holds the end of liquid crystal mother panel 8 jutting out from the upper side of the table 5 in a grab-like manner. The capturing portion 32 is provided with a pair of mats 34 which are adhered to areas of the capturing portion 32 which contact the respective sides of the held liquid crystal mother panel 8. A suction pad 37 is provided on the upper side of the capturing portion 32. The suction pad 37 can be moved upward and downward by a cylinder 38 for up- and down-motions. The suction pad 37 can also be moved by a cylinder 39 provided on the upper side of the cylinder 33 in the direction indicated by the arrow Y3.

The capturing mechanism 31 comprises a supporting post 35 which supports the capturing portion 32 in such a manner that the capturing portion 32 can be moved upward and downward. A motor 36 for moving the capturing portion 32 upward and downward is provided on the supporting post 35. The supporting post 35 can be moved by another motor (not shown) back and forth in the direction indicated by the arrow Y3.

Referring again to FIG. 1, the liquid crystal panel separation production line 100 comprises a conveyer 15. The conveyer 15 transfers one row segment of the liquid crystal mother panel 8A separated by the liquid crystal panel separation apparatus 1 to a downstream positioning site where the liquid crystal mother panel 8A is positioned. The conveyer 15 is provided with a rotating table 16. The rotating table 16 is used to rotate, by 90 degrees, the liquid crystal mother panel 8A positioned at the positioning site.

The liquid crystal panel separation production line 100 comprises a liquid crystal panel separation apparatus 1A. The liquid crystal panel separation apparatus 1A has the same configuration as that of the liquid crystal panel separation apparatus 1, except that the liquid crystal panel separation apparatus 1A has a widthwise dimension shorter than that of the liquid crystal panel separation apparatus 1. Therefore, the detailed description of the configuration of the liquid crystal panel separation apparatus 1A is omitted. The liquid crystal panel separation apparatus 1A separates the liquid crystal mother panel 8A rotated by 90 degrees by the rotating table 16 into liquid crystal panels 9. The liquid crystal panels 9 separated by the liquid crystal panel separation apparatus 1A are transferred to a product stock 18 by a removing robot 17.

Figure 4:
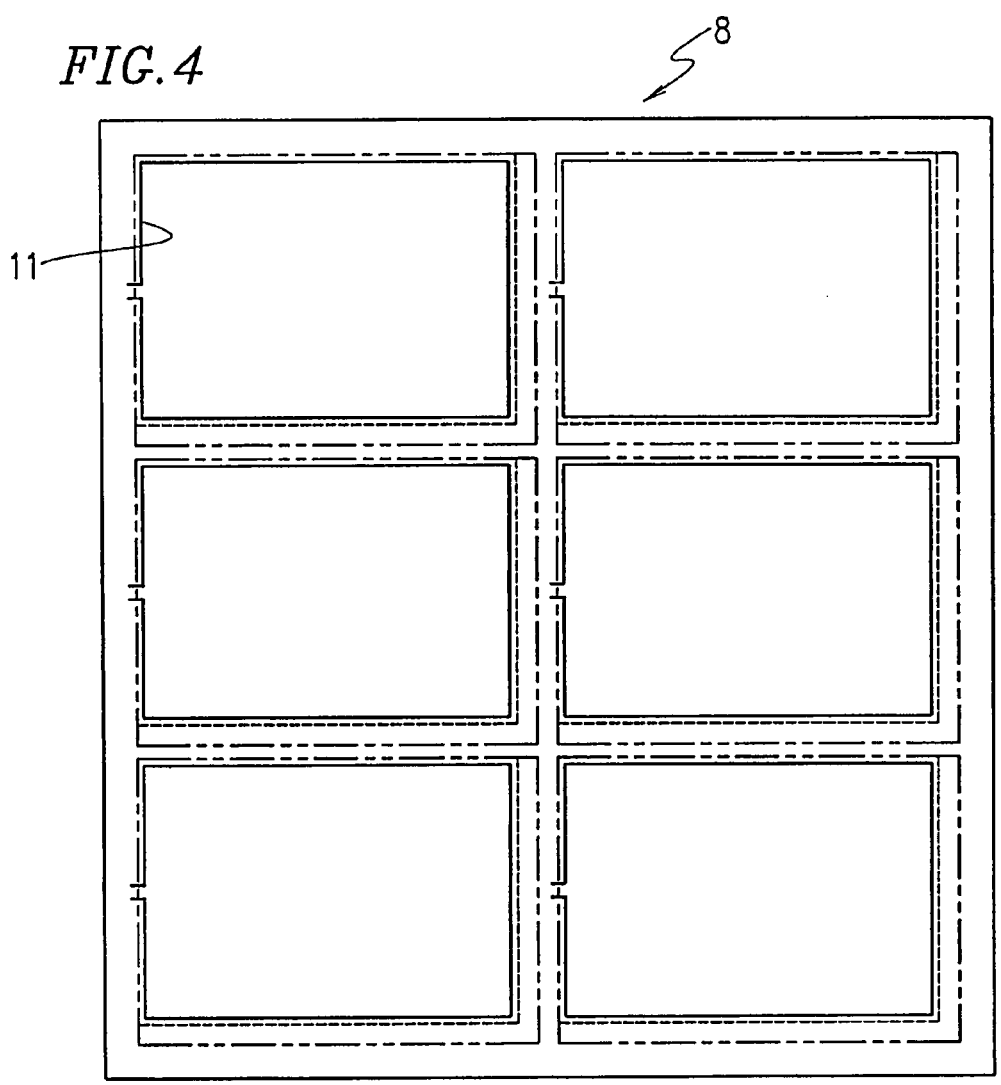
FIG. 4 is a plan view showing a liquid crystal mother panel separated by the liquid crystal panel separation apparatus shown in FIG. 2.
Figure 5:
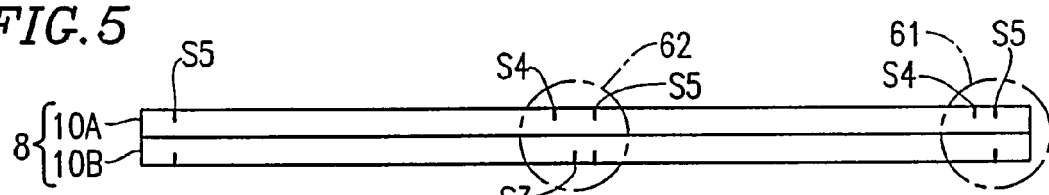
FIG. 5 is a front view showing the liquid crystal mother panel of FIG. 4.
Figure 6:
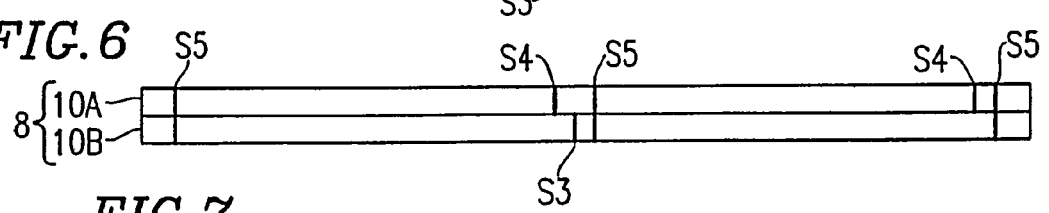
FIG. 6 is a front view showing the liquid crystal mother panel after scribing.
Figure 7:
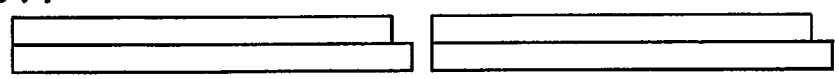
FIG. 7 is a front view showing a liquid crystal panel separated from the liquid crystal mother panel.

FIG. 4 is a plan view showing the liquid crystal mother panel 8 separated by the liquid crystal panel separation apparatus 1 shown in FIGS. 2 and 3. FIG. 5 is a front view showing the liquid crystal mother panel 8 of FIG. 4. FIG. 6 is a front view showing the liquid crystal mother panel 8 after scribing. FIG. 7 is a front view showing one segment of the liquid crystal mother panel 8A separated into two the liquid crystal mother panel 8A. The liquid crystal mother panel 8 is separated into six liquid crystal panels 9 in a 3×2 matrix after six division. A seal 11 is provided between the two glass substrates constituting the liquid crystal mother panel 8. Liquid crystal is poured from an injection opening into a gap between the two glass substrates surrounded by the seal 11.

Figure 50:
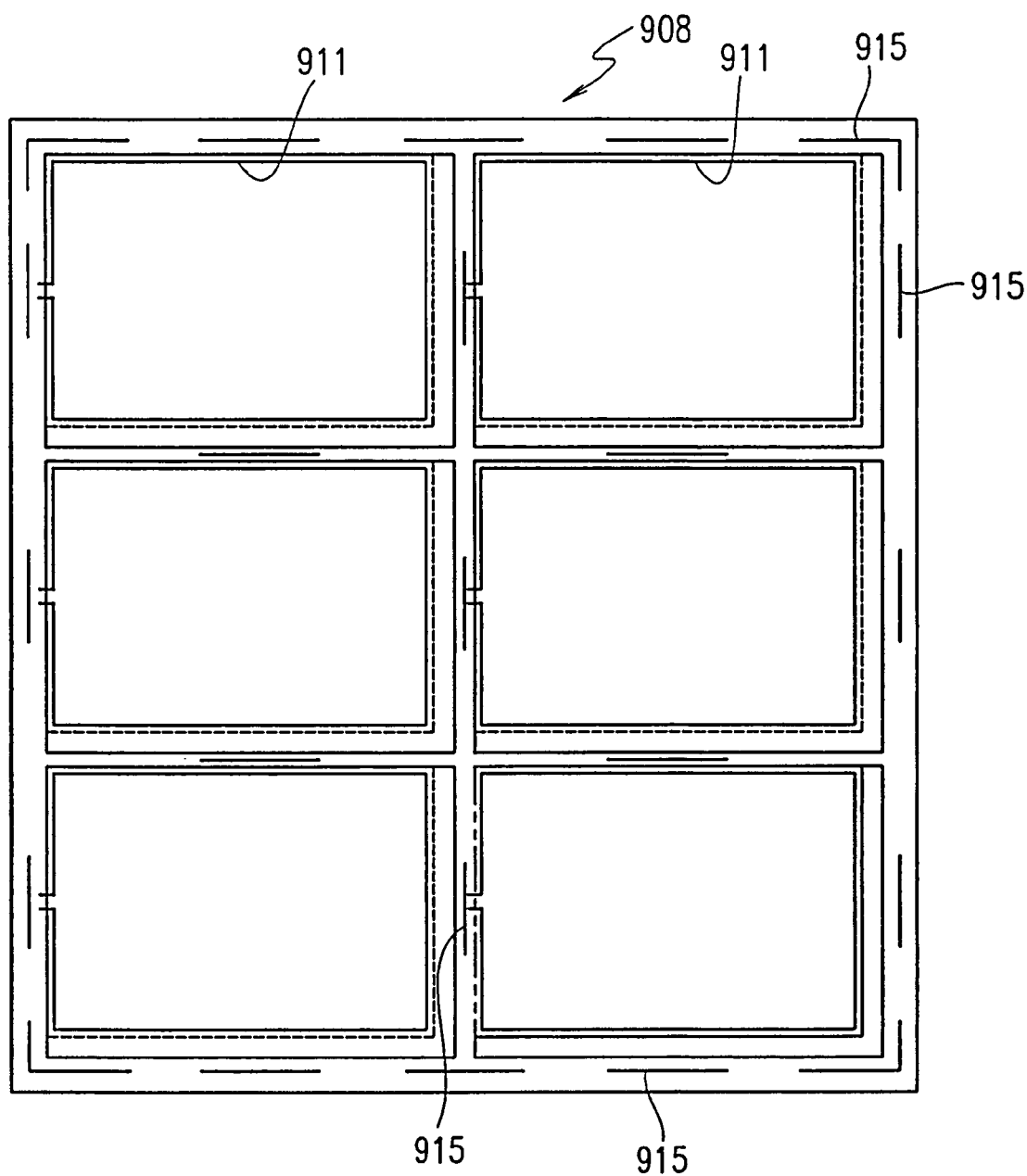
FIG. 50 is a plan view showing a seal provided in the conventional liquid crystal mother panel.
Figure 51:
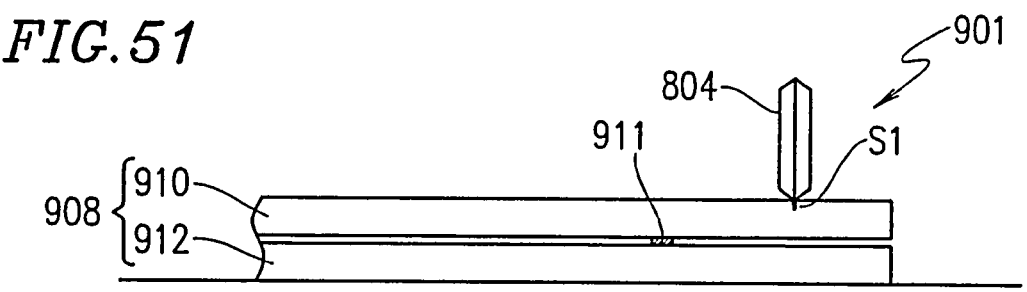
FIG. 51 is a front view for explaining an operation of the conventional scribing apparatus.
Figure 52:
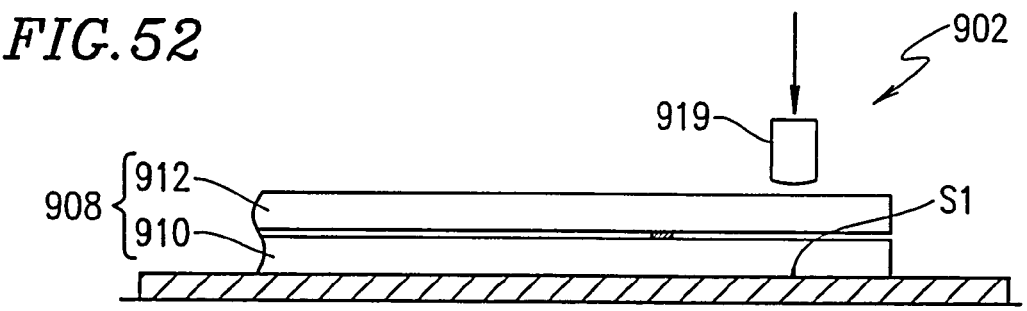
FIG. 52 is a front view for explaining an operation of the conventional breaking apparatus.
Figure 53:
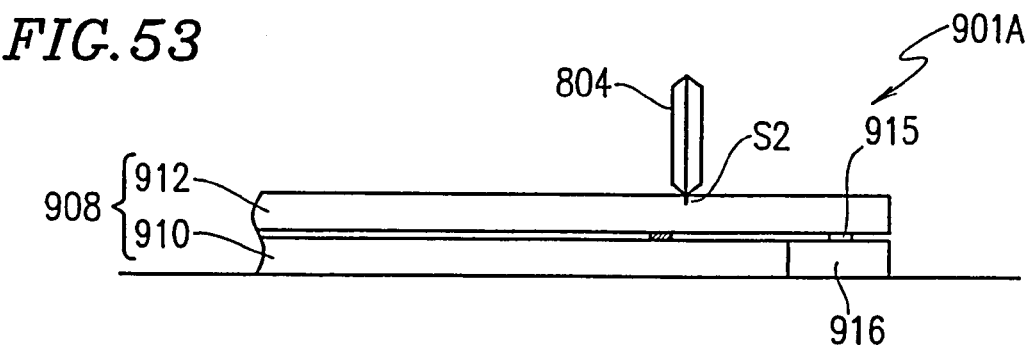
FIG. 53 is a front view for explaining an operation of another conventional scribing apparatus.
Figure 54:
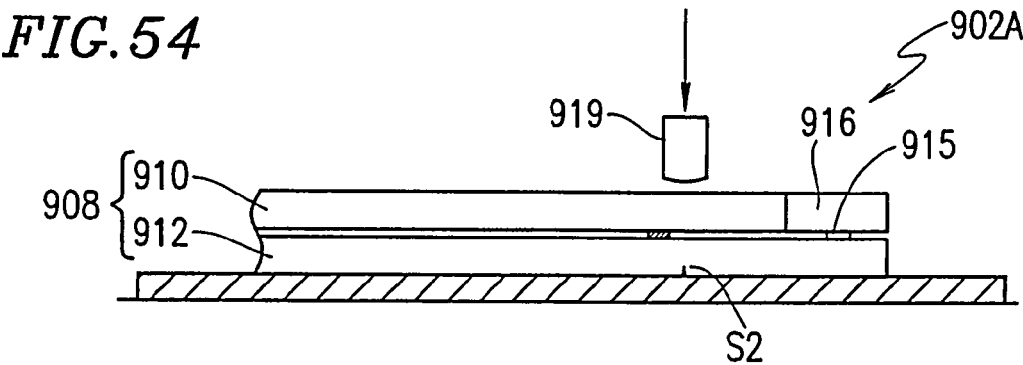
FIG. 54 is a front view for explaining an operation of another conventional breaking apparatus.
Figure 55:
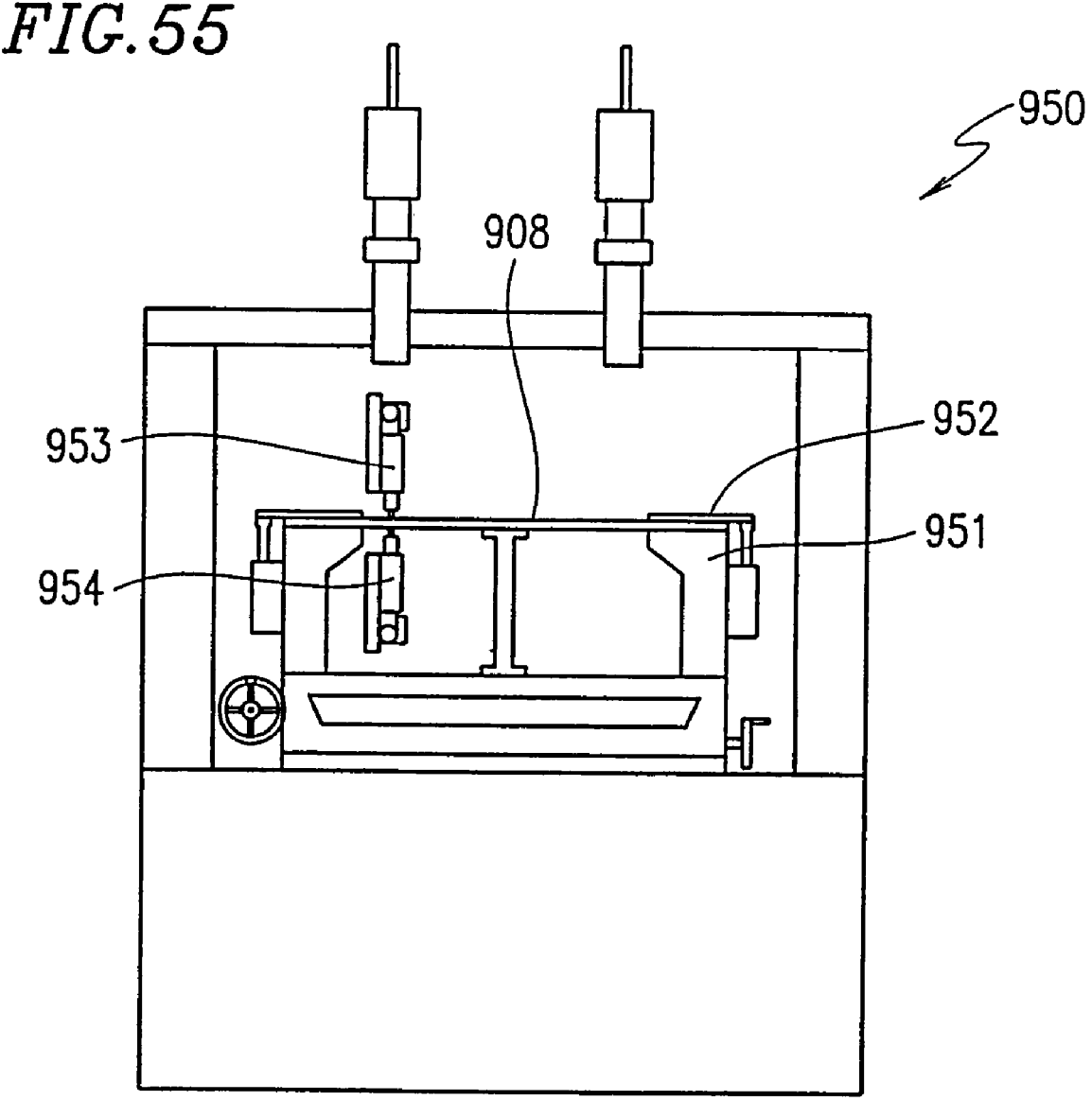
FIG. 55 is a diagram showing a configuration of still another conventional scribing apparatus.

The liquid crystal mother panel 8 is provided with an intended scribing line S3 for separating the lower glass substrate, an intended scribing line S4 for separating the upper glass substrate, and an intended scribing line S5 for separating both the upper and lower glass substrates. In the liquid crystal mother panel 8, the adhesive seal 915 is not provided unlike the liquid crystal mother panel 908 described above with reference to FIG. 50, and only the seal 11 for injecting liquid crystal is provided.

The operation of the thus-constructed liquid crystal panel separation production line 100 will be described. The feeding robot 13 sucks and holds the liquid crystal mother panels 8 stocked in the loader 12 one by one, and places the liquid crystal mother panel 8 on the conveyer 14. Thereafter, the liquid crystal mother panel 8 placed on the conveyer 14 is transferred to the front side of the liquid crystal panel separation production line 100 (toward the right in FIG. 1), and is then positioned.

Figure 8:
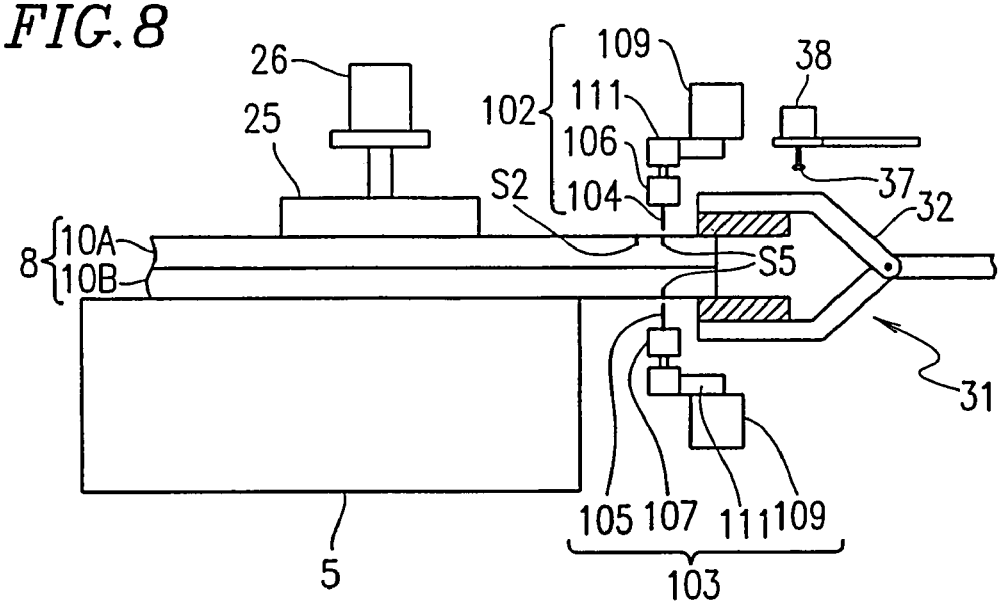
FIGS. 8 through 16 are front views for explaining an operation of the liquid crystal panel separation apparatus of Embodiment 1.

FIGS. 8 through 16 are front views for explaining the operation of the liquid crystal panel separation apparatus 1 according to Embodiment 1. The operation of scribing the intended scribing lines S5 and S4 in a region 61 shown in FIG. 5, will be described. Referring to FIG. 8, the suction pad 25 of the suction transferring mechanism 2 provided in the liquid crystal panel separation apparatus 1, sucks the liquid crystal mother panel 8 positioned on the conveyer 14, and transfers the liquid crystal mother panel 8 to a position where the intended scribing line S5 provided on the liquid crystal mother panel 8 is disposed between the cutter wheel chip 104 provided in the scribing portion 102 and the cutter wheel chip 105 in the scribing portion 103, and an end of the liquid crystal mother panel 8 juts out of the table 5. The cutter wheel chips 104 and 105 are opposed to each other across the intended scribing line S5. The table 5 sucks and fixes the transferred liquid crystal mother panel 8. The capturing portion 32 provided in the capturing mechanism 31 holds one end of the liquid crystal mother panel 8.

The cutter wheel chips 104 and 105 simultaneously scribe the respective glass substrates 10A and 10B, which constitute the liquid crystal mother panel 8, along the intended scribing line S5 by the above-described linear interpolation. If the traveling speeds of the cutter wheel chips 104 and 105 at which they are brought in contact with the respective glass substrates 10A and 10B, are less than the traveling speeds in scribing, it is possible to prevent the occurrence of flaws due to shock when the cutter wheel chips 104 and 105 are brought onto the respective glass substrates 10A and 10B. With the cutter wheel chips 104 and 105 of Embodiment, deep vertical cracks which reach the inner surfaces of the glass substrates 10A and 10B, can be developed. As such cutter wheel chips 104 and 105, a glass cutter wheel chip disclosed in Japanese Patent No. 3,074,143 owned by the present applicant is used.

Figure 9:
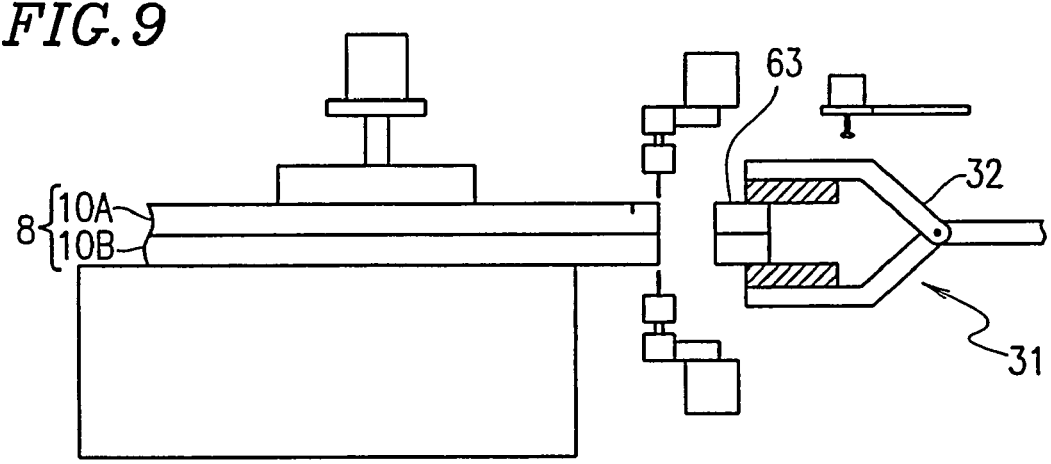

Referring to FIG. 9, since it turns out that the deep vertical cracks which reach the inner surfaces of the glass substrates 10A and 10B, are formed along the intended scribing line S5 with the cutter wheel chips 104 and 105, when the capturing portion 32 holding the end of the liquid crystal mother panel 8 is simply moved toward the right in FIG. 9, a substrate fragment 63 separated from the liquid crystal mother panel 8 along the formed scribing line, can be removed.

Figure 10:
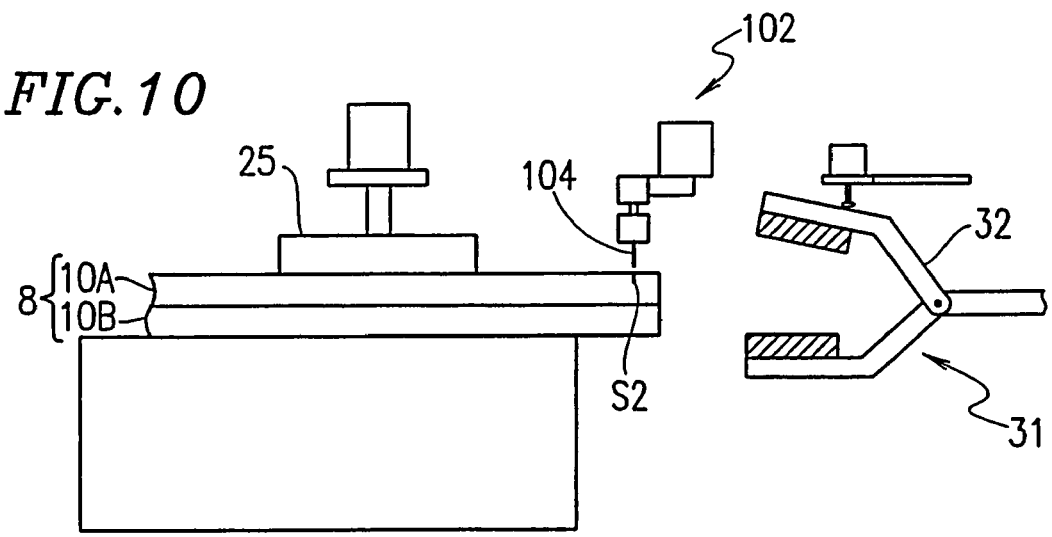

Referring to FIG. 10, the capturing portion 32 is opened to release the substrate fragment 63. Thereafter, the table 5 stops holding and fixing the liquid crystal mother panel 8 by suction. The suction pad 25 sucks, holds and transfers the liquid crystal mother panel 8 so that the intended scribing line S4 is shifted below the cutter wheel chip 104 provided in the scribing portion 102. Since the scribing portion 103 is shifted in a direction perpendicular to the plane of the figure so as not to obstruct the movement of the liquid crystal mother panel 8, the scribing portion 103 is not shown in FIGS. 10 through 13.

Figure 11:
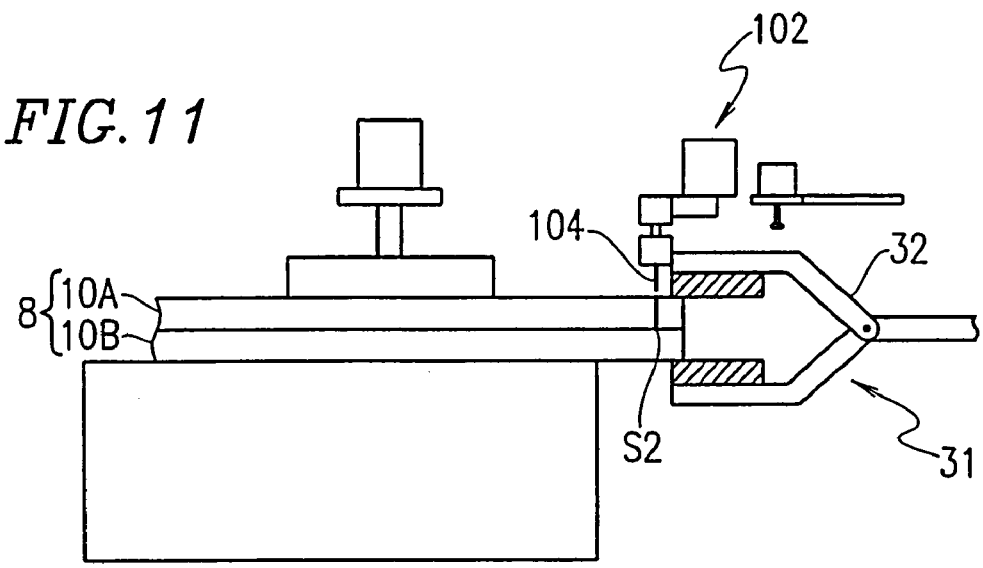

Referring to FIG. 11, the capturing portion 32 holds an end of the liquid crystal mother panel 8. Thereafter, the cutter wheel chip 104 scribes the glass substrate 10A along the intended scribing line S4.

Figure 12:
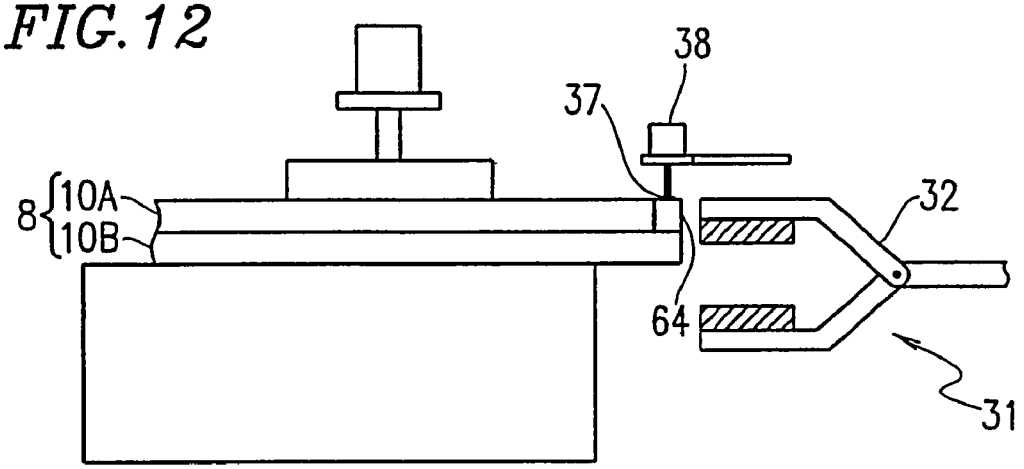

Referring to FIG. 12, the capturing portion 32 releases the end of the liquid crystal mother panel 8, and is then retracted toward the right in FIG. 12. The suction pad 37 provided in the capturing mechanism 31 sucks and holds a substrate fragment 64 separated from the liquid crystal mother panel 8 by the cutter wheel chip 104 along the intended scribing line S2.

Figure 13:
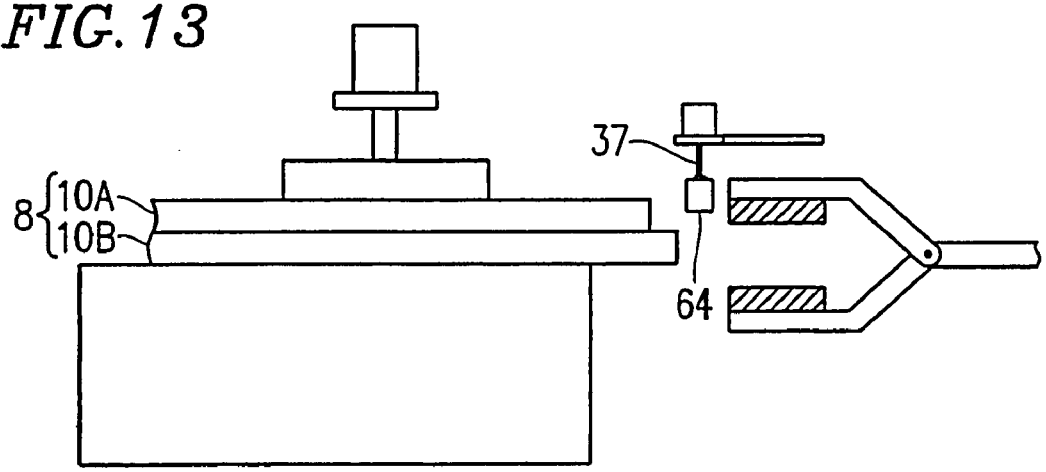

Referring to FIG. 13, the suction pad 37 sucking the substrate fragment 64, is shifted toward the right in FIG. 13. Thus, the substrate fragment 64 separated from the liquid crystal mother panel 8 by the cutter wheel chip 104, is removed.

Figure 14:
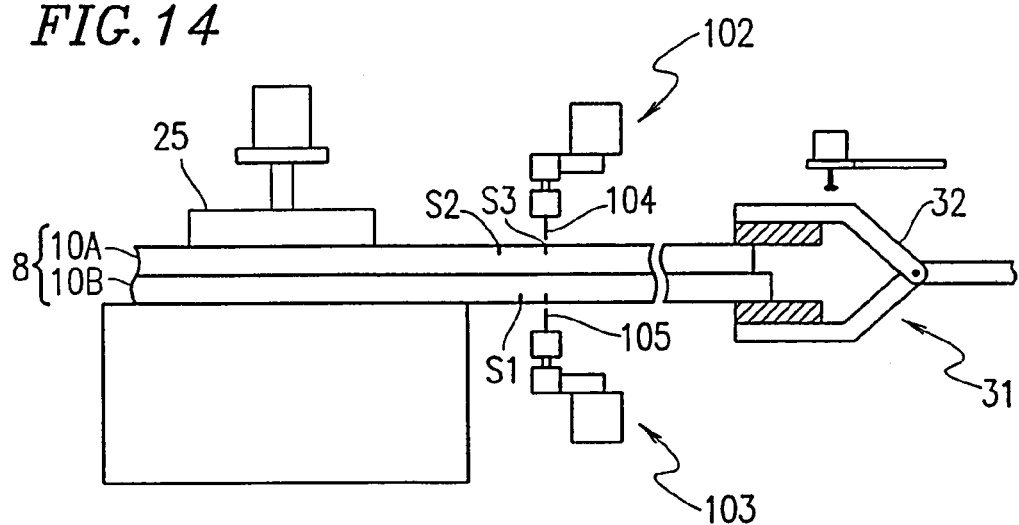

Next, the scribing operation of the scribing lines S3, S4 and S5 in a region 62 in FIG. 5, will be described. Referring to FIG. 14, the suction pad 25 of the suction transferring mechanism 2 transfers the liquid crystal mother panel 8 so that the intended scribing line S5 previously provided on the liquid crystal mother panel 8, is located between the cutter wheel chip 104 and the cutter wheel chip 105. The capturing portion 32 holds an end of the liquid crystal mother panel 8. The cutter wheel chips 104 and 105 simultaneously scribe the glass substrates 10A and 10B constituting the liquid crystal mother panel 8 along the intended scribing line S5. The capturing portion 32 holding the end of the liquid crystal mother panel 8, is moved toward the right in FIG. 14 resulting in that a liquid crystal mother panel 8A, which is one row segment of the liquid crystal mother panel 8, along the intended scribing line S5. The capturing portion 32 places the separated liquid crystal mother panel 8A on the conveyer 15 shown in FIG. 1.

Figure 15:
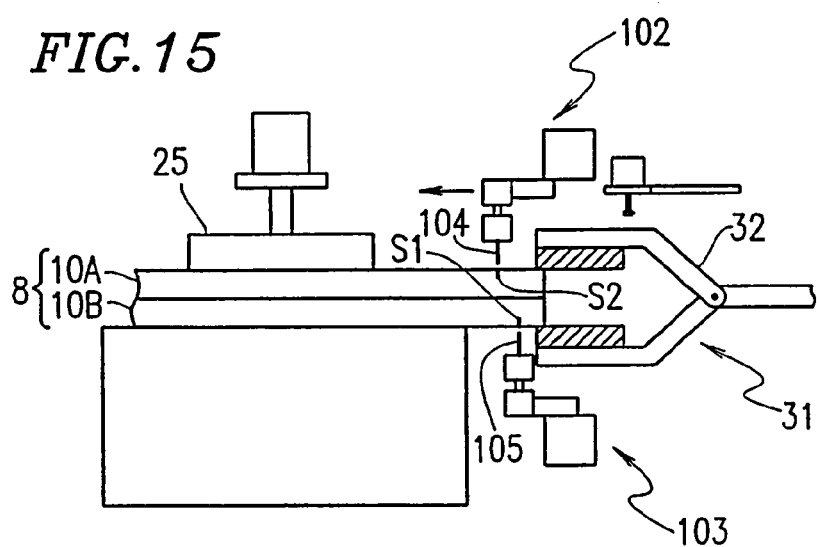

Referring to FIG. 15, the liquid crystal mother panel 8 is transferred by the suction pad 25 so that the intended scribing line S3 is shifted over the cutter wheel chip 105, while the intended scribing line S4 is shifted below the cutter wheel chip 104. The cutter wheel chip 104 provided in the scribing portion 102, has been moved toward the right by a distance along the horizontal direction between the intended scribing lines S3 and S4 in FIG. 15. The cutter wheel chip 104 scribes the glass substrate 10A along the intended scribing line S4, while the cutter wheel chip 105 scribes the glass substrate 10B along the intended scribing line S3.

Figure 16:
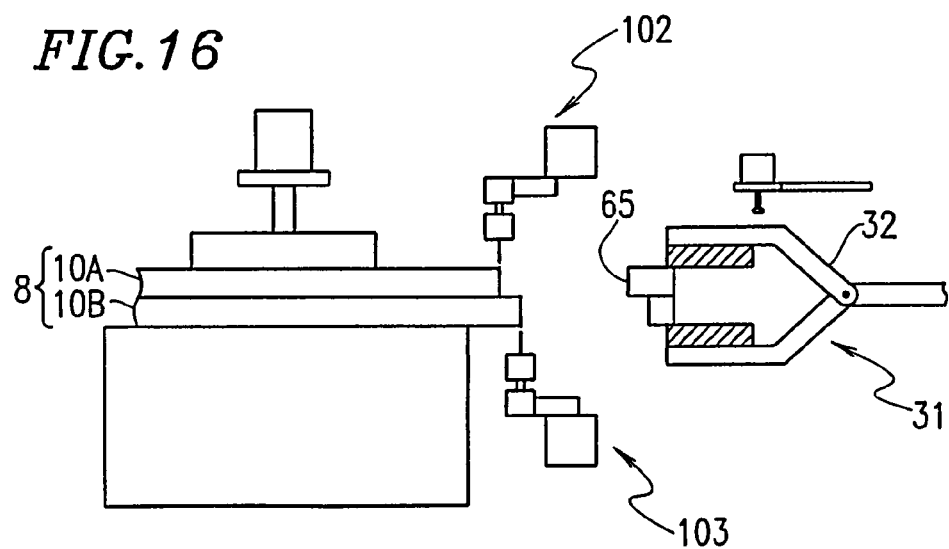

Referring to FIG. 16, the capturing portion 32 holding the end of the liquid crystal mother panel 8, is moved toward the right in FIG. 16, thereby removing the substrate fragment 65 separated from the liquid crystal mother panel 8 along the intended scribing lines S3 and S4.

Referring again to FIG. 1, the liquid crystal mother panel 8A placed on the conveyer 15 by the capturing portion 32, is transferred to a downstream positioning site, and is then positioned. The liquid crystal mother panel 8A positioned at the positioning site is rotated by 90 degrees by the rotating table 16. The liquid crystal mother panel 8A is separated into liquid crystal panels 9 in a manner similar to that of the operation of the above-described liquid crystal panel separation apparatus 1. The liquid crystal panels 9 separated by the liquid crystal panel separation apparatus 1A are transferred by the removing robot 17 to the product stock 18.

It should be noted that a liquid crystal panel is illustrated above as an Embodiment of a bonded brittle material substrate comprising two brittle material substrates bonded together, but the present invention is not limited to this. For example, the present invention can be applied to a flat display panel, such as a plasma display panel, an organic EL display panel, and the like, which comprises glass substrates bonded together, and a bonded semiconductor substrate comprising a silicon substrate, a sapphire substrate, or the like bonded with a glass substrate. The same is true of Embodiments 2 and 3 to be described below.

In the above-described Embodiment, the liquid crystal mother panel 8A is separated from the liquid crystal mother panel 8 by the liquid crystal panel separation apparatus 1, and is then separated into the liquid crystal panels 9 by the liquid crystal panel separation apparatus 1A, but the present invention is not limited to this. Alternatively, the liquid crystal mother panel 8A separated from the liquid crystal mother panel 8 by the liquid crystal panel separation apparatus 1 may be transferred by the capturing mechanism 31 to a subsequent stage liquid crystal injection apparatus.

Further, in the above-described Embodiment, the liquid crystal panel 8 separated by the liquid crystal panel separation apparatus 1A is transferred to a product stock. Alternatively, the liquid crystal panel 8 separated by the liquid crystal panel separation apparatus 1A may be transferred by the capturing portion 31A provided in the liquid crystal panel separation apparatus 1A to a subsequent stage inspection apparatus, liquid crystal injection apparatus, or the like.

Furthermore, in the above-described Embodiment, the scribing mechanism 4 is disposed between the table 5 and the capturing mechanism 31, but the present invention is not limited to this. Alternatively, a cut portion having a width larger than that of the liquid crystal mother panel 8 may be provided in the table 5, a scribing portion 103 may be disposed in the cut portion so that the lower surface of the liquid crystal mother panel 8 across the cut portion, can be scribed, and a scribing portion 102 may be disposed in the cut portion so that the upper surface of the liquid crystal mother panel 8 across the cut portion, can be scribed.

As described above, according to Embodiment 1, the liquid crystal mother panel 8 is held and transferred by the suction transferring mechanism 2 so that an intended scribing line on the liquid crystal mother panel 8 is located between the cutter wheel chips 104 and 105 respectively provided in the scribing portions 102 and 103. The liquid crystal mother panel 8 transferred by the suction transferring mechanism 2 so that the intended scribing line is disposed between the cutter wheel chips 104 and 105, is separated by the cutter wheel chips 104 and 105 along the intended scribing line.

Therefore, the opposite sides of a liquid crystal mother panel comprising two glass substrates can be simultaneously separated, whereby it is not necessary to scribe and break each side of the liquid crystal mother panel separately. As a result, inverting and breaking steps are not required, thereby reducing processing time for separating a liquid crystal mother panel and greatly reducing the footprint (occupied area) of an apparatus for separating a liquid crystal mother panel.

Embodiment 2

Figure 17:
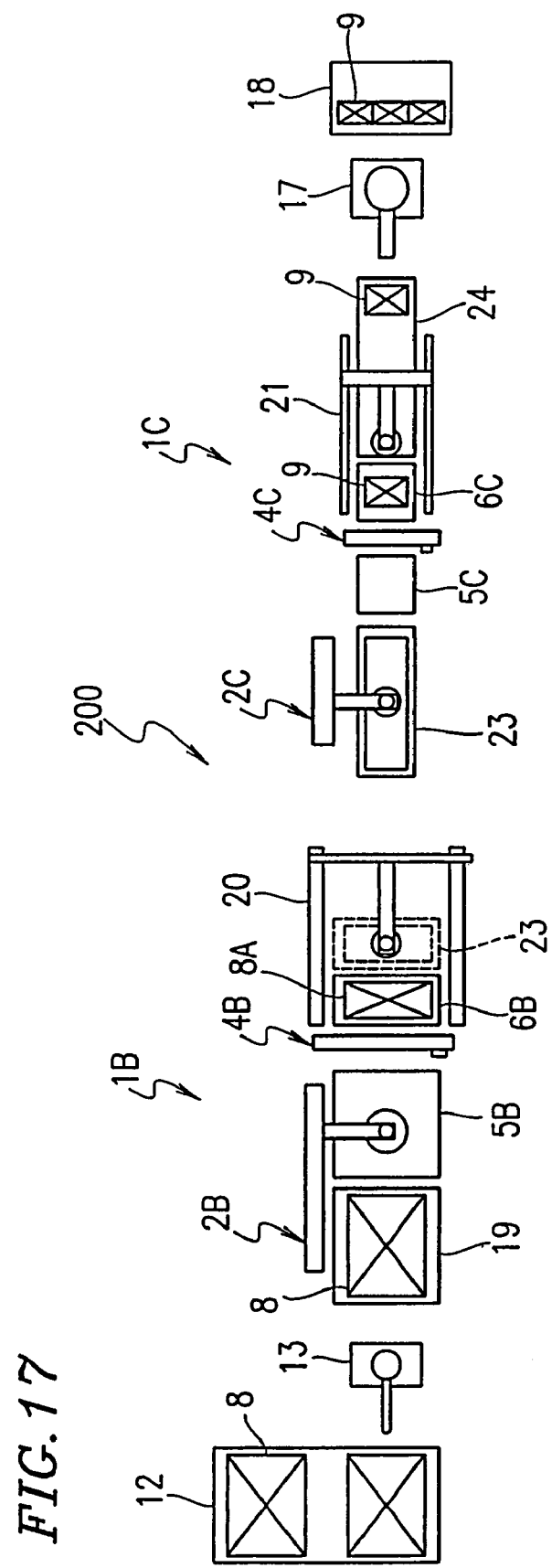
FIG. 17 is a plan view showing a liquid crystal panel separation line according to Embodiment 2 of the present invention.

A liquid crystal panel separation production line according to Embodiment 2 is a production line for separating a liquid crystal mother panel into liquid crystal panels in a manner similar to that of Embodiment 1. FIG. 17 is a plan view showing a liquid crystal panel separation production line 200 according to Embodiment 2 of the present invention. The same parts as those of corresponding parts of the liquid crystal panel separation production line 100 according to Embodiment 1 are referred to by the same reference characters and are not described in detail.

The liquid crystal panel separation production line 200 comprises a loader 12 for stocking liquid crystal mother panels 8. The liquid crystal panel separation production line 200 is provided with a feeding robot 13. The feeding robot 13 sucks and holds one by one the liquid crystal mother panels 8 stocked in the loader 12 and places it on a positioning table 19.

Figure 18:
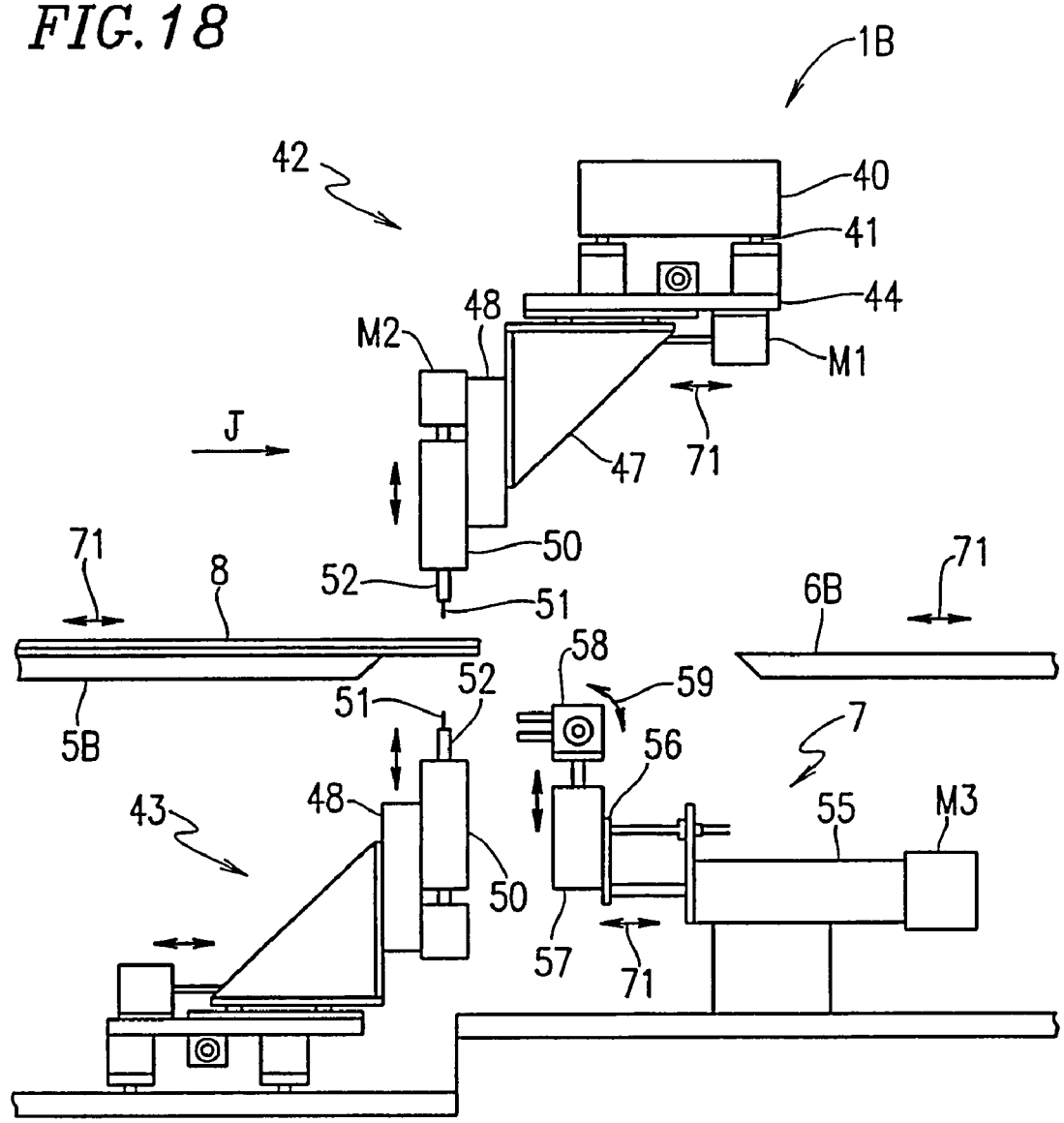
FIG. 18 is a front view showing a liquid crystal panel separation apparatus according to Embodiment 2 of the present invention.

The liquid crystal panel separation production line 200 comprises a liquid crystal panel separation apparatus 1B. FIG. 18 is a front view showing the liquid crystal panel separation apparatus 1B. Referring to FIGS. 17 and 18, the liquid crystal panel separation apparatus 1B comprises an upstream table 5B and a downstream table 6B, and the liquid crystal mother panel 8 is placed thereon. The upstream table 5B and the downstream table 6B can be moved in a horizontal direction indicated by an arrow 71. The liquid crystal panel separation apparatus 1B is provided with a suction transferring mechanism 2B. The suction transferring mechanism 2B sucks and holds the liquid crystal mother panel 8 placed on the positioning table 19 and transfers it onto the upstream table 5B.

The liquid crystal panel separation apparatus 1B comprises a scribing mechanism 4B for scribing the liquid crystal mother panel 8. The scribing mechanism 4B is disposed between the upstream table 5B and the downstream table 6B. The scribing mechanism 4B has a pair of supporting posts (not shown). A guide bar 40 is joined with the one pair of supporting posts. The guide bar 40 is located across the liquid crystal mother panel 8 which has been transferred by the suction transferring mechanism 2B, and over the upstream table 5B and the downstream table 6B. A pair of rails 41 are provided on the lower surface of the guide bar 40. The guide bar 40 is provided with a scribing portion 42 for scribing the upper glass substrate of the two glass substrates constituting the liquid crystal mother panel 8. The scribing portion 42 can be slid along the rails 41.

The scribing portion 42 is provided with a moving member 44 which can be slid along the rails 41. A rail is provided on the lower surface of the moving member 44 along a direction indicated by the arrow 71. A moving member 47 is also provided so as to be capable of moving by a motor M1 in the direction indicated by the arrow 71. A base 48 is fixed at the moving member 47. A holder supporting member 50 is fixed to the base 48 so as to be moved upward and downward by a motor 2 and a ball screw. A scribing head 52 which supports a cutter wheel chip 51 rotatively, is provided at the lower end of the holder supporting member 50.

Figure 19:
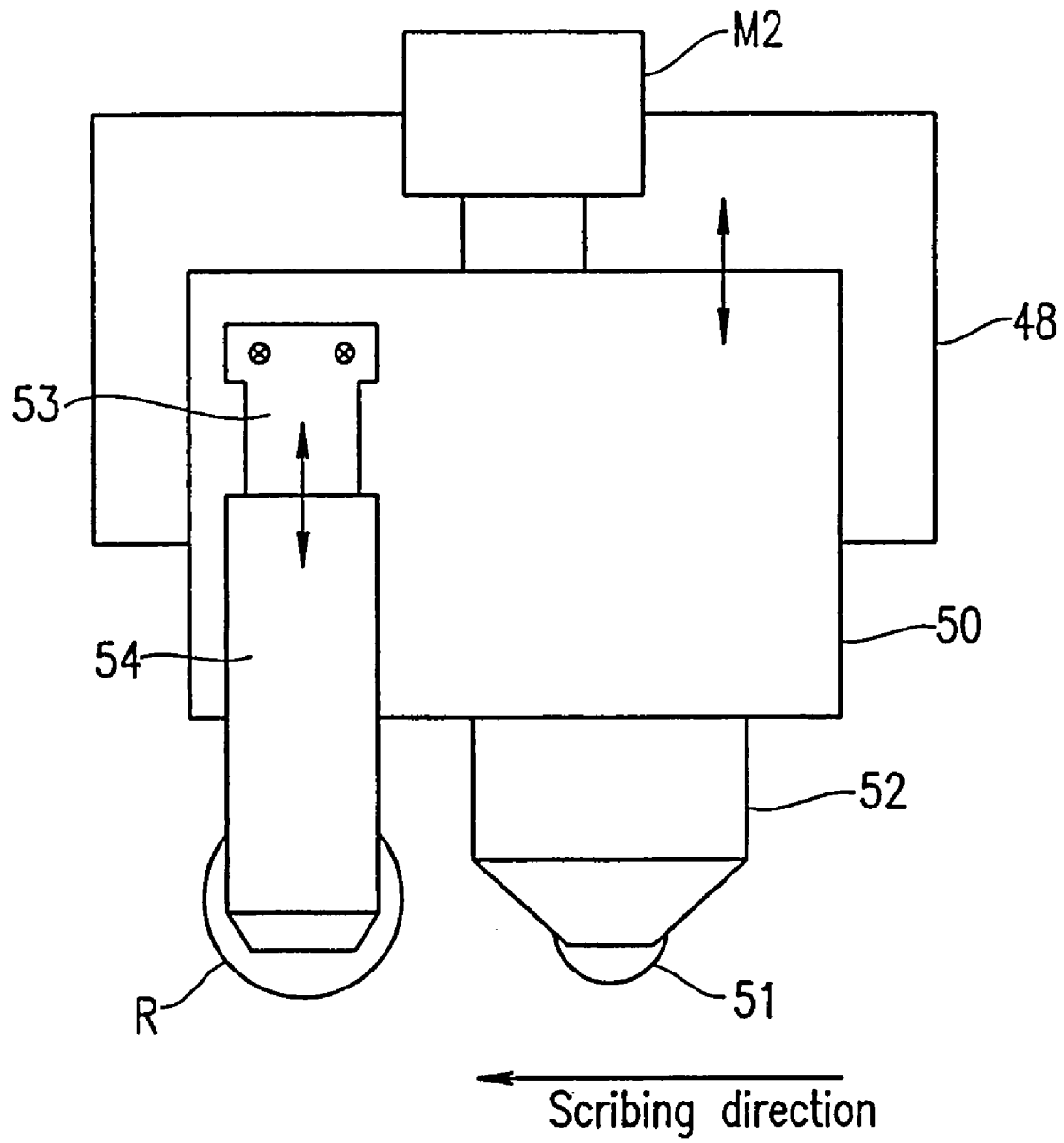
FIG. 19 is a diagram showing a configuration of a scribing head portion provided in the liquid crystal panel separation apparatus of Embodiment 2.

FIG. 19 is a diagram showing a configuration of the scribing head 52 and a surrounding mechanism, viewed in a direction indicated by an arrow J in FIG. 18. A cylinder 53 is fixed to the holder supporting member 50 so that a roller attachment 54 can be moved upward and downward. A roller R is rotatively attached at the lower end of the roller attachment 54 so as to be rotated. The roller R is aligned with the cutter wheel chip 51. The roller R and the cutter wheel chip 51 are moved together in an upward and a downward directions by the motor M2. The roller R can be moved upward and downward by the cylinder 53. The roller R is made of an engineering plastic, such as Teflon™, Duracon™, and the like, or an elastic material, such as hard rubber and the like. The diameter of the roller R is 5 mm or more and 15 mm or less. The thickness of the roller R is 2 mm or more and 5 mm or less. The engineering plastic or elastic material constituting the roller R is preferably electrically conductive for the purpose of avoiding static electricity.

A scribing portion 43 is provided below the upstream table 5B for scribing the lower glass substrate of the two glass substrates constituting the liquid crystal mother panel 8. The scribing portion 43 has the same configuration as that of the above-described scribing portion 42, and is provided so as to face the scribing portion 42.

A mechanism 7 for removing a substrate fragment is provided below the downstream table 6B. The substrate fragment removing mechanism 7 comprises a robot cylinder 55 for driving a base 56 in a horizontal direction indicated by an arrow 71. A motor M3 for driving the robot cylinder 55 is attached to the robot cylinder 55. A cylinder 57 is vertically provided on the base 56. A holding apparatus 58 is attached to an upper part of the cylinder 57 so as to be moved upward and downward. The holding apparatus 58 can be rotated in a direction indicated by an arrow 59.

Referring again to FIG. 17, the liquid crystal panel separation production line 200 comprises a suction transferring portion 20. The suction transferring portion 20 sucks and holds the liquid crystal mother panel 8A separated by the liquid crystal panel separation apparatus 1B, and transfers it to a transferring table 23. The transferring table 23 on which the liquid crystal mother panel 8A is placed by the suction transferring portion 20 is rotated by 90 degrees and then the liquid crystal mother panel 8A is transferred to a position where the liquid crystal mother panel 8A is adjacent to a liquid crystal panel separation apparatus 1C.

The liquid crystal panel separation production line 200 comprises the liquid crystal panel separation apparatus 1C. The liquid crystal panel separation apparatus 1C has the same configuration as that of the liquid crystal panel separation apparatus 1B, except that the width of the liquid crystal panel separation apparatus 1C is smaller than that of the liquid crystal panel separation apparatus 1B. Therefore, the detailed description of the configuration of the liquid crystal panel separation apparatus 1C is omitted. The liquid crystal mother panel 8A transferred by the transferring table 23 is separated into liquid crystal panels 9 by the liquid crystal panel separation apparatus 1C. The liquid crystal panels 9 separated by the liquid crystal panel separation apparatus 1C are transferred by the removing robot 17 to the product stock 18.

The operation of the thus-constructed liquid crystal panel separation production line 200 will be described. The feeding robot 13 sucks and holds one-by-one the liquid crystal mother panels 8 stocked in the loader 12 and places it on the positioning table 19.

Figure 20:
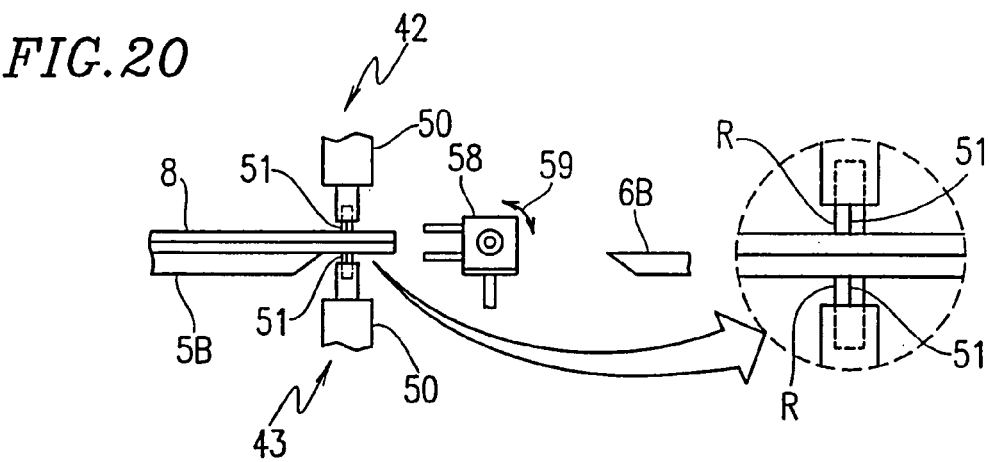

FIGS. 20 through 35 are front views showing the operation of the liquid crystal panel separation apparatus 1B of Embodiment 2. Referring to FIG. 20, a suction pad of the suction transferring mechanism 2B provided in the liquid crystal panel separation apparatus 1B sucks and holds the liquid crystal mother panel 8 placed on the positioning table 19, and transfers the held liquid crystal mother panel 8 to a position where a previously intended scribing line on the liquid crystal mother panel 8 is located between the cutter wheel chip 51 provided in the scribing portion 42 and the cutter wheel chip 51 provided in the scribing portion 43 and an end of the liquid crystal mother panel 8 juts out from the table 5B.

The holder supporting member 50 provided in the scribing portion 42 is driven by the motor M2 and moved downward. The cutter wheel chip 51 provided in the scribing portion 42 contacts and presses the upper glass substrate of the two glass substrates constituting the liquid crystal mother panel 8 with a predetermined cutting pressure. The roller R provided in the scribing portion 42 contacts and presses the upper glass substrate with a predetermined contact pressure. Similarly, in the scribing portion 43, the holder supporting member 50 is driven by the motor M2 upward. The cutter wheel chip 51 provided in the scribing portion 43 contacts and presses the lower glass substrate of the two glass substrates constituting the liquid crystal mother panel 8 with a predetermined cutting pressure. The roller R provided in the scribing portion 43 contacts and presses the lower glass substrate with a predetermined contact pressure.

As shown in an enlarged view of FIG. 20, the cutter wheel chips 51 provided in the scribing portions 42 and 43 are aligned vertically. The two cutter wheel chips 51 simultaneously scribe the upper and lower glass substrates constituting the liquid crystal mother panel 8 along the intended scribing line using linear interpolation. In this scribing, the rollers R provided in the scribing portions 42 and 43 constantly hold the liquid crystal mother panel 8, so that the cutting pressures of the upper and lower side cutter wheel chips 51 can be equal.

Figure 21:
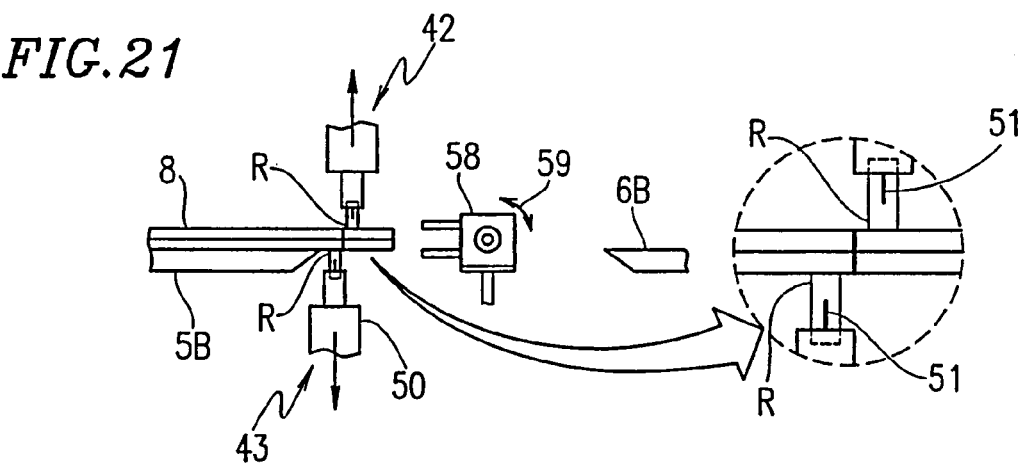

Referring to FIG. 21, in the scribing portion 42 after scribing, the holder supporting member 50 is elevated by a predetermined amount. Therefore, the cutter wheel chip 51 and the roller R are released from the upper glass substrate. Thereafter, the base 48 is shifted by a predetermined amount toward the right direction in FIG. 21. The roller R is then lowered by the cylinder 53. As a result, only the roller R contacts and presses the upper glass substrate with a predetermined pressure.

In the scribing portion 43 after scribing, the holder supporting member 50 is lowered by a predetermined amount. Therefore, the cutter wheel chip 51 and the roller R are released from the lower glass substrate. The base 48 is then shifted by a predetermined amount toward the left direction in FIG. 21. Thereafter, the roller R is elevated by the cylinder 53. As a result, only the roller R contacts and presses the lower glass substrate with a predetermined pressure.

In this situation, when the rollers R provided in the respective scribing portions 42 and 43 are being moved to their original positions before scribing, the rollers R roll on the upper and lower glass substrates, thereby exerting a bending moment about a scribing line on the liquid crystal mother panel 8. When the rollers R return to the original positions before scribing, the roller R provided in the scribing portion 42 is moved upward while the roller R provided in the scribing portion 43 is moved downward.

It should be noted that although in the above-described Embodiment, the roller R provided in the scribing portion 42 is moved toward the right direction while the roller R provided in the scribing portion 43 is moved toward the left direction, conversely, the roller R provided in the scribing portion 42 may be moved toward the left direction while the roller R provided in the scribing portion 43 may be moved toward the right direction.

With the cutter wheel chips 51 of the Embodiment, a deep vertical crack having a depth corresponding to about 90% of the thickness of a glass substrate can be formed. Since a deep vertical crack is formed along a scribing line by each cutter wheel chip 51, a liquid crystal mother panel is substantially completely separated by a bending moment caused by the rolling of the scribing line roller R. Therefore, the step shown in FIG. 21 is a breaking step.

Figure 22:
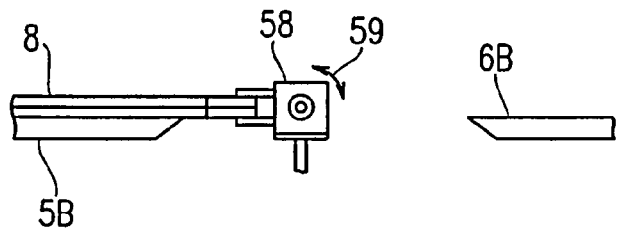
Figure 23:
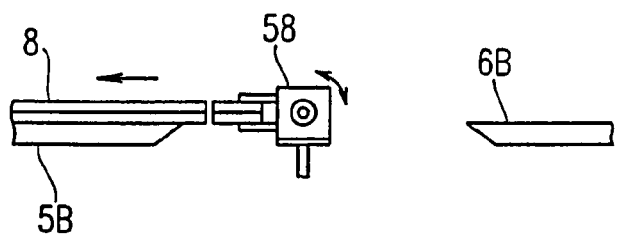

Referring to FIG. 22, the holding apparatus 58 is moved toward the left direction in FIG. 22, and a chuck portion provided in the holding apparatus 58 holds a substrate fragment of the liquid crystal mother panel 8. Referring to FIG. 23, the upstream table 5B on which the liquid crystal mother panel 8 is placed, is moved toward the left direction. The substrate fragment is held by the chuck portion provided in the holding apparatus 58. Thus, the substrate fragment is separated from the liquid crystal mother panel 8.

Figure 24:
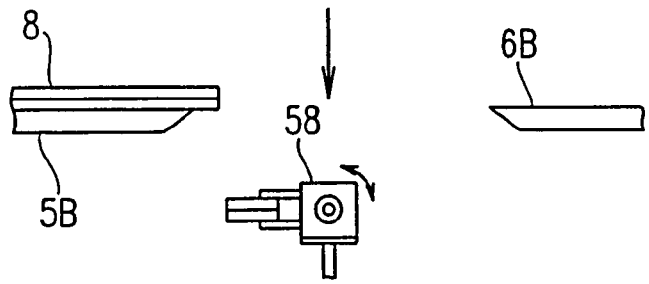
Figure 25:
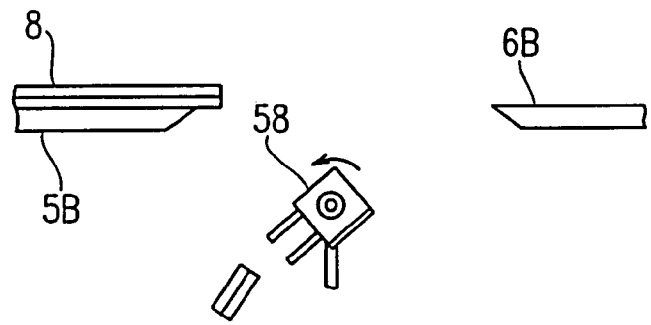
Figure 26:
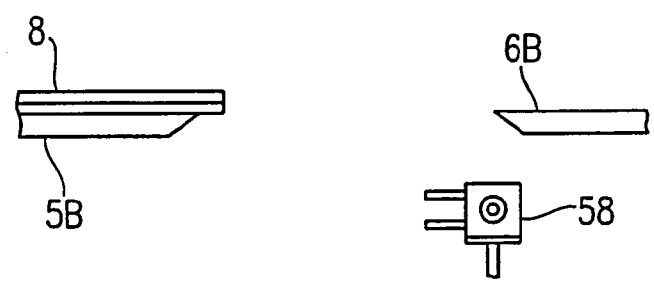

Referring to FIG. 24, the holding apparatus 58 having the chuck portion holding the substrate fragment, is moved downward. Referring to FIG. 25, the holding apparatus 58 is rotated in a counterclockwise direction indicated by an arrow in FIG. 25, so that the chuck portion provided in the holding apparatus 58 is opened and the substrate fragment held by the chuck portion is dropped and discarded. Referring to FIG. 26, the holding apparatus 58 returns to its original position.

Figure 27:
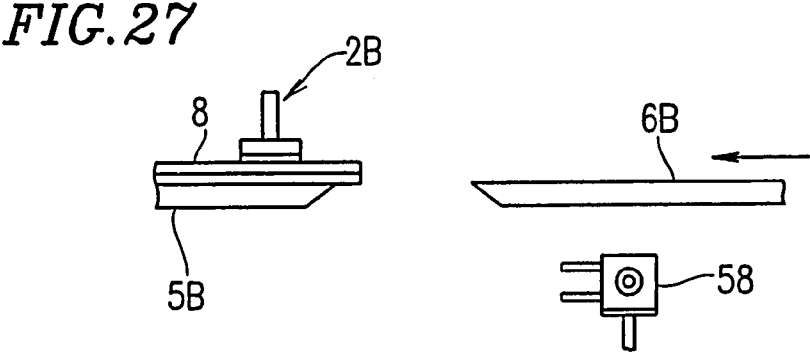

Referring to FIG. 27, the downstream table 6B is moved toward the left direction. The suction pad provided in the suction transferring mechanism 2B sucks and holds the liquid crystal mother panel 8 placed on the upstream table 5B. Referring to FIG. 28, the liquid crystal mother panel 8 held by the suction pad is transferred so that the liquid crystal mother panel 8 is placed across the upstream table 5B and the downstream table 6B and another intended scribing line on the liquid crystal mother panel 8 will be located between the scribing portions 42 and 43.

Referring to FIG. 29, similar to the case shown in FIG. 20, the two cutter wheel chips 51 are used to scribe the upper and lower glass substrates constituting liquid crystal mother panel 8 along another intended scribing line using the above-described linear interpolation.

Referring to FIG. 30, similar to the case shown in FIG. 21, the rollers R provided in the respective scribing portions 42 and 43 after scribing, roll on the upper and lower glass substrates, respectively, when the rollers R returns to their original positions.

Referring to FIG. 31, the downstream table 6B on which a part of the liquid crystal mother panel 8A separated from the liquid crystal mother panel 8 is placed, is moved toward the right direction. The liquid crystal mother panel 8A placed on the downstream table 6B, is drawn away from the liquid crystal mother panel 8 placed on the upstream table 5B. The liquid crystal mother panel 8A placed on the downstream table 6B, is transferred by the suction transferring portion 20 to the transferring table 23.

By repeating the steps shown in FIGS. 28 through 31, liquid crystal mother panels 8A are additionally separated from the liquid crystal mother panel 8 and are transferred to the transferring table 23.

Figure 32:
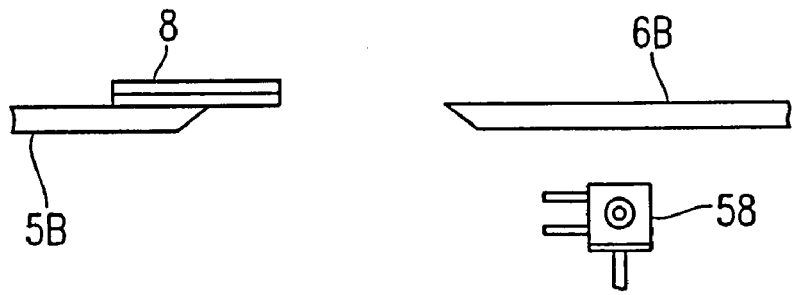
Figure 33:
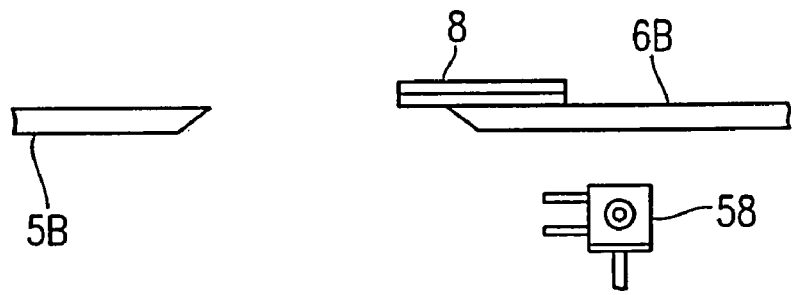

Referring to FIG. 32, the last portion of the liquid crystal mother panel 8 remains on the upstream table 5B. Referring to FIG. 33, the liquid crystal mother panel 8 is shifted by the suction transferring portion 20 in such a manner that another intended scribing line to be formed at the left end of the liquid crystal mother panel 8, is located between the cutter wheel chip 51 provided in the scribing portion 42 and the cutter wheel chip 51 provided in the scribing portion 43, and the left end of the liquid crystal mother panel 8 juts out from the downstream table 6B.

Similar to the case shown in FIG. 20, the upper and lower glass substrates constituting the liquid crystal mother panel 8, are simultaneously scribed by the two cutter wheel chips 51 along the above-described intended scribing line using the above-described linear interpolation. Thereafter, similar to the case shown in FIG. 21, the rollers R provided in the respective scribing portions 42 and 43 after scribing roll on the upper and lower glass substrates, respectively, when they return to their original positions before scribing.

Figure 34:
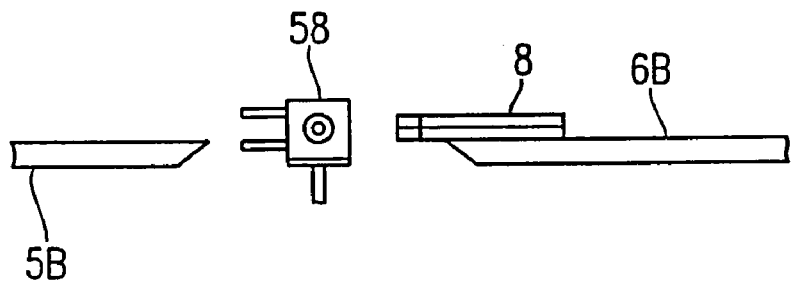
Figure 35:
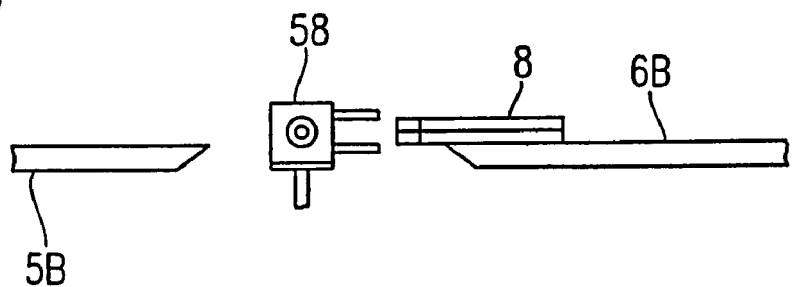

Referring to FIG. 34, the holding apparatus 58 is elevated. Referring to FIG. 35, the holding apparatus 58 is rotated so that the chuck portion faces the downstream table 6B. Thereafter, the chuck portion provided in the holding apparatus 58 holds the substrate fragment of the liquid crystal mother panel 8. Thereafter, the downstream table 6B on which the liquid crystal mother panel 8A is placed, is moved toward the right direction. The substrate fragment is held by the chuck portion provided in the holding apparatus 58. Thus, the substrate fragment is separated from the liquid crystal mother panel 8A. Thereafter, the holding apparatus 58 having the chuck portion holding the substrate fragment is moved downward. The holding apparatus 58 discards the substrate fragment. The liquid crystal mother panel 8A placed on the downstream table 6B is transferred by the suction transferring portion 20 to the transferring table 23.

Referring again to FIG. 17, after the liquid crystal mother panel 8A is transferred by the suction transferring portion 20 to the transferring table 23, the transferring table 23 is rotated by 90 degrees and the liquid crystal mother panel 8A is then transferred to a position where the liquid crystal mother panel 8A is adjacent to the liquid crystal panel separation apparatus 1C. The liquid crystal mother panel 8A is separated into the liquid crystal panels 9 by the liquid crystal panel separation apparatus 1C in a manner similar to that of the liquid crystal panel separation apparatus 1B. The liquid crystal panels 9 separated by the liquid crystal panel separation apparatus 1C are transferred by the removing robot 17 to the product stock 18.

As described above, in Embodiment 2, the liquid crystal mother panel 8 is held and transferred by the suction transferring mechanism 2B so that the intended scribing line to be provided in the liquid crystal mother panel 8 will be located between the cutter wheel chips 51 provided in the scribing portions 42 and 43. The liquid crystal mother panel 8, an intended scribing line of which has been located between the cutter wheel chips 51 by the suction transferring mechanism 2B, is scribed along the intended scribing line by the cutter wheel chips 51.

Therefore, the both sides of the liquid crystal mother panel comprising two glass substrates can be simultaneously separated, so that it is no longer necessary that each side of the liquid crystal mother panel is scribed and broken separately. As a result, processing time for separating the liquid crystal mother panel can be reduced and, in addition, the footprint (occupied area) of an apparatus for separating the liquid crystal mother panel can be reduced.

Figure 36:
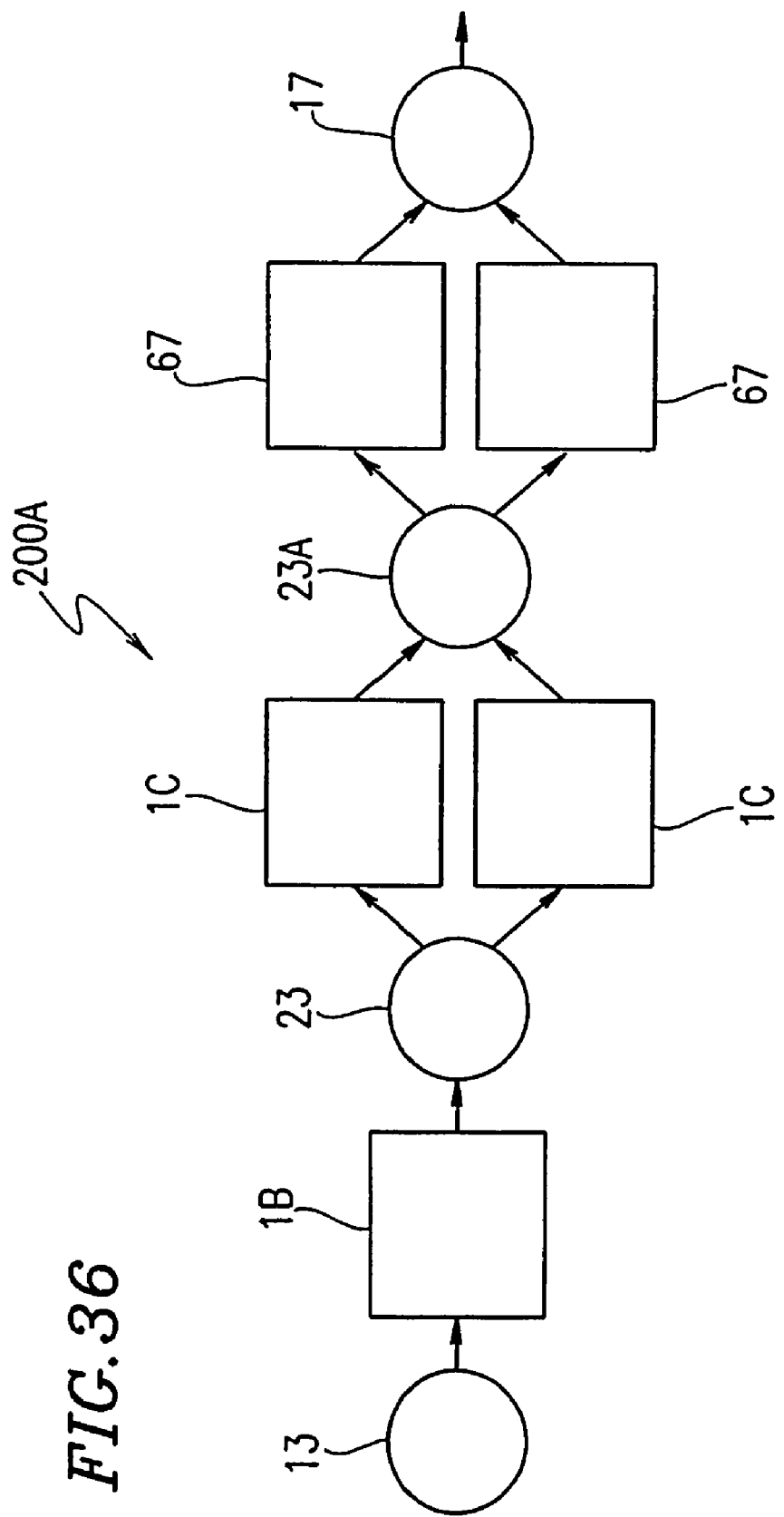
FIG. 36 is a plan view showing another liquid crystal panel separation production line according to Embodiment 2 of the present invention.

FIG. 36 is a plan view showing another liquid crystal panel separation production line 200A according to Embodiment 2 of the present invention. The same parts as those of corresponding parts of the liquid crystal panel separation production line 200 of Embodiment 2 are referred to by the same reference characters and are not described in detail.

The liquid crystal panel separation production line 200A comprises the liquid crystal panel separation apparatus 1B. The liquid crystal panel separation apparatus 1B is used to separate the liquid crystal mother panel 8 supplied by the feeding robot 13 into the liquid crystal mother panels 8A and supplies them to the transferring robot 23. The transferring robot 23 feeds the liquid crystal mother panels separated by the liquid crystal panel separation apparatus 1B to two liquid crystal panel separation apparatuses 1C, respectively. The liquid crystal mother panel 8A supplied by the transferring robot 23 is separated by each liquid crystal panel separation apparatus 1C into liquid crystal panels 9 which are in turn supplied to a transferring robot 23A. The transferring robot 23A supplies the liquid crystal panels 9 separated by each liquid crystal panel separation apparatus 1C to two chamfering apparatuses 67. The liquid crystal panel 9 supplied by the transferring robot 23A is chamfered by each chamfering apparatus 67 and is then supplied to the removing robot 17. The liquid crystal panel 9 chamfered by each chamfering apparatus 67 is transferred by the removing robot 17 to a subsequent step.

As described above, in case that the liquid crystal panel separation apparatuses 1C are disposed in parallel, further decreasing of a tact time can be expected. Moreover, even if one of the liquid crystal panel separation apparatuses 1C happen to be out of order, the separation process can be continued by the other liquid crystal panel separation apparatus 1C.

Figure 37:
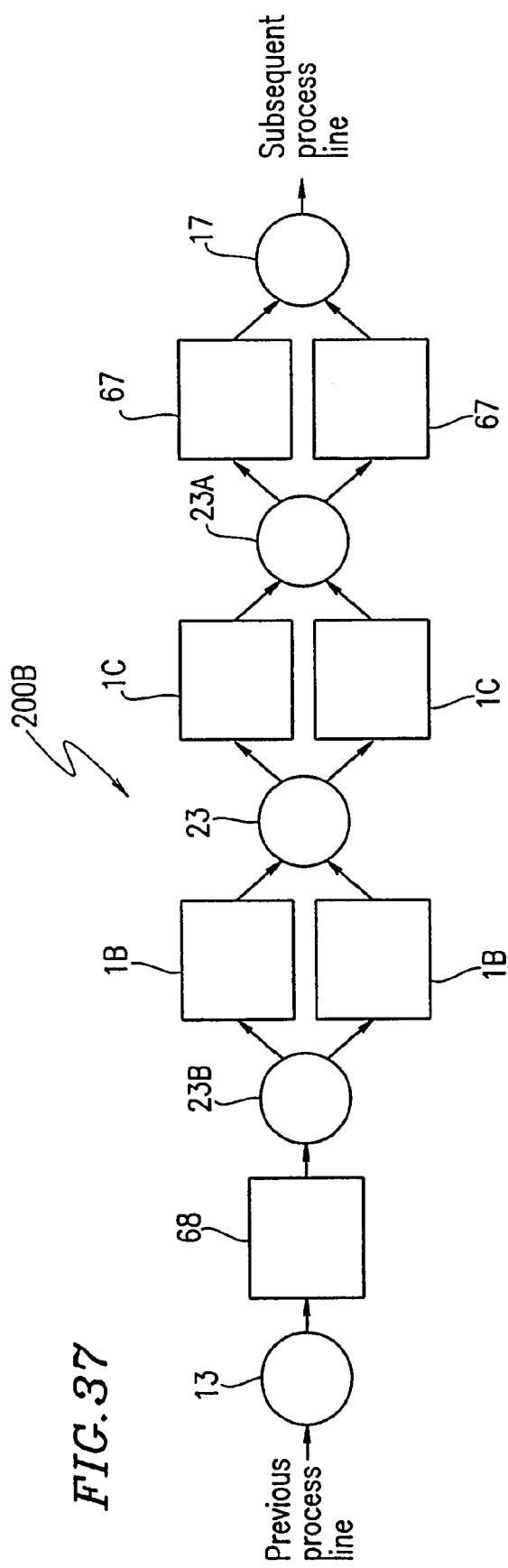
FIG. 37 is a plan view showing still another liquid crystal panel separation production line according to Embodiment 2 of the present invention.

FIG. 37 is a plan view showing still another liquid crystal panel separation production line 200B according to Embodiment 2 of the present invention. The same parts as those of corresponding parts of the liquid crystal panel separation production line 200A described above with reference to FIG. 36, are referred to by the same reference characters and are not described in detail. A different point from the liquid crystal panel separation production line 200A is that there are further two liquid crystal panel separation apparatuses 1B disposed in parallel, and that a feeding cassette 68 and a transferring robot 23B are further provided.

Thus, by providing the liquid crystal panel separation apparatuses 1B in parallel, a tact time can be further decreased. Moreover, even if one of the liquid crystal panel separation apparatuses 1B happen to be out of order, the separation step can be continued by the other liquid crystal panel separation apparatus 1B.

Embodiment 3

A liquid crystal panel separation apparatus according to Embodiment 3 of the present invention reduces the tact time of a scribing step for a liquid crystal mother panel.

Figure 38:
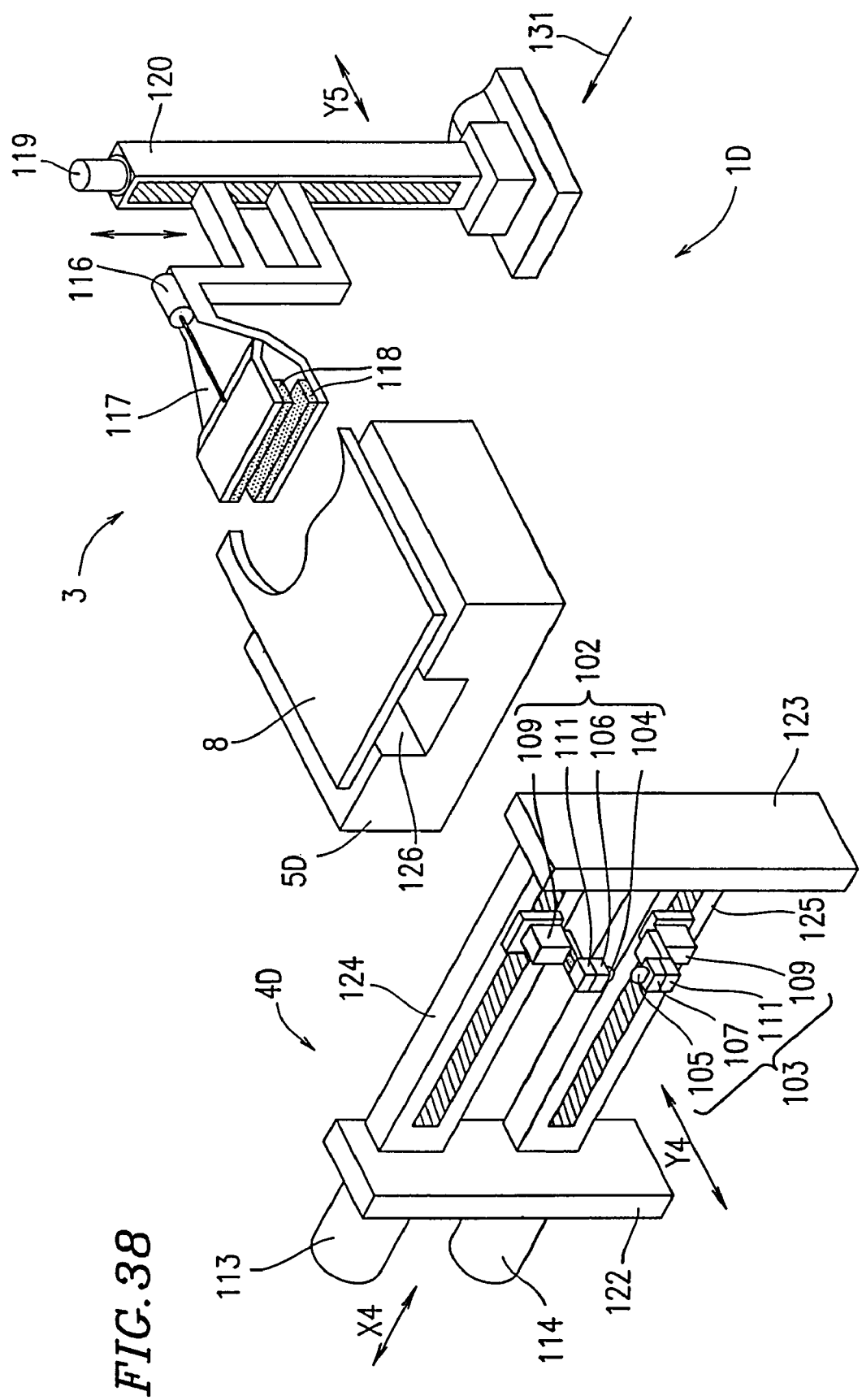
FIG. 38 is a perspective view showing a scriber for scribing glass according to Embodiment 3 of the present invention.
Figure 39:
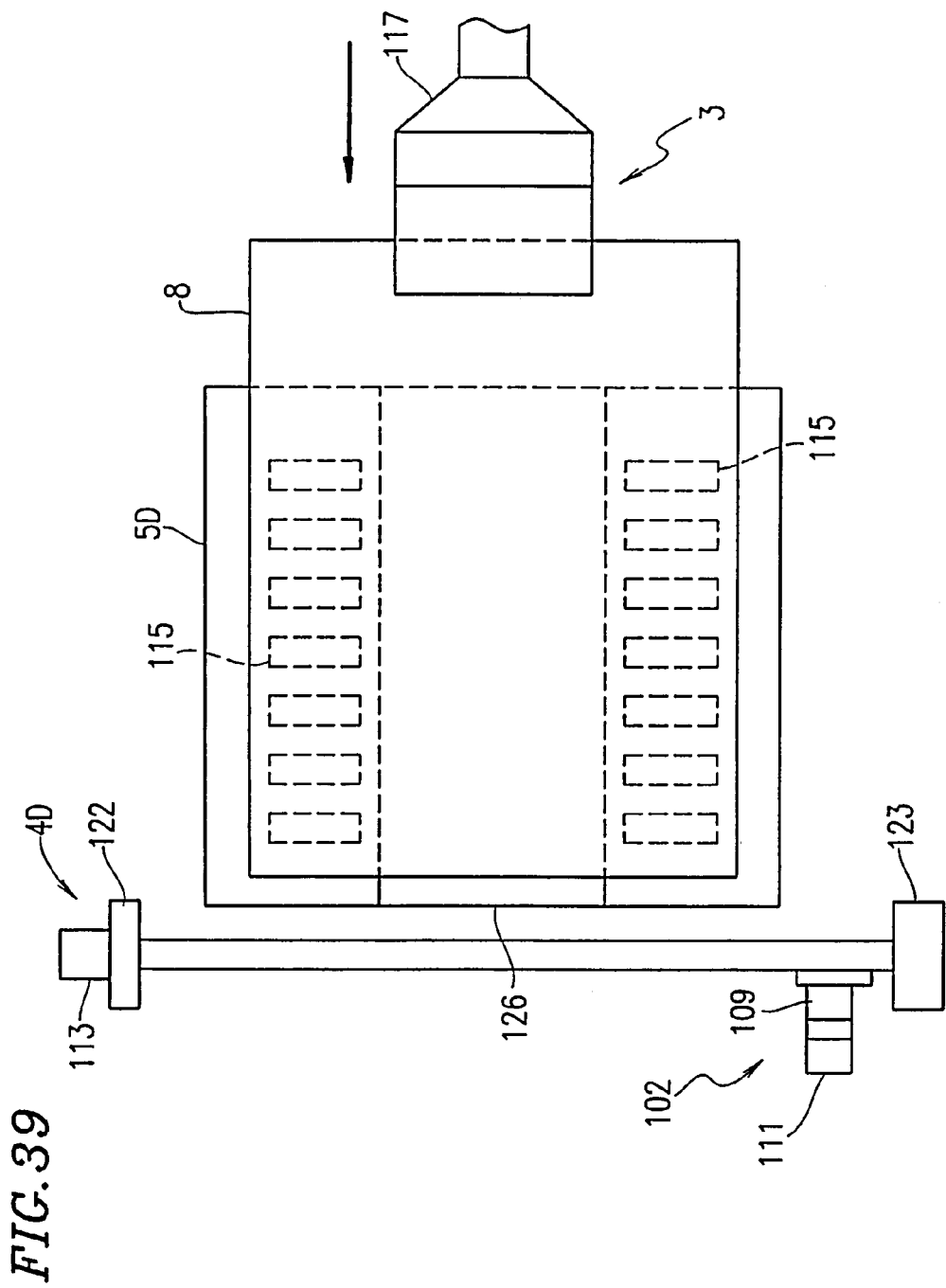
FIG. 39 is a plan view showing a major part of the glass scriber of Embodiment 3.

FIG. 38 is a perspective view showing a liquid crystal panel separation apparatus 1D according to Embodiment 3 of the present invention. FIG. 39 is a plan view showing a major part of the liquid crystal panel separation apparatus 1D. The liquid crystal panel separation apparatus 1D comprises a table 5D substantially in the shape of a rectangle. A liquid crystal mother panel 8 is placed on the upper surface of the table 5D in such a manner that an end of the liquid crystal mother panel 8 juts out from the upper surface of the table 5D.

The liquid crystal panel separation apparatus 1D comprises a holding and transferring mechanism 3. The holding and transferring mechanism 3 holds the end of the liquid crystal mother panel 8 which juts out from the upper side of the table 5D in a grab-like manner. The liquid crystal mother panel 8 is pushed by the holding and transferring mechanism 3 along the upper surface of the table 5D so that the liquid crystal mother panel 8 is transferred on the upper surface of the table 5D. The holding and transferring mechanism 3 is provided with a capturing portion 117 substantially in the shape of Y when viewed from a direction indicated by an arrow 131 in FIG. 38. The capturing portion 117 is opened or closed by the movement of a cylinder 116, and holds the end of the liquid crystal mother panel 8 jutting out from the upper side of the table 5D in a grab-like manner. A pair of mats 118 are attached to the capturing portion 117 at portions thereof which contact and press opposite surfaces of the liquid crystal mother panel 8, respectively. The holding and transferring mechanism 3 comprises a supporting post 120 which supports the capturing portion 117 in such a manner that the capturing portion 117 can be moved upward and downward. A motor 119 for moving the capturing portion 117 upward and downward is provided on the supporting post 120. The supporting post 120 is moved back and forth in a direction indicated by an arrow Y5 by another motor (not shown).

The table 5D has a capturing portion guiding groove 126 which is provided along a direction in which the liquid crystal mother panel 8 is pushed by the capturing portion 117 so that the capturing portion 117 holding and pushing the liquid crystal mother panel 8 can be proceeded into the table 5D. A plurality of rollers 115 on which the liquid crystal mother panel 8 is placed are provided on the opposite sides of the capturing portion guiding groove 126 in a direction in which the liquid crystal mother panel 8 is pushed by the capturing portion 117.

A scribing mechanism 4D for scribing the liquid crystal mother panel 8 is provided on a side opposite to the holding and transferring mechanism 3 with respect to the table 5D. The scribing mechanism 4D has a pair of supporting posts 122 and 123. To the pair of supporting posts 122 and 123 are joined guide bars 124 and 125 for sandwiching on the front and rear sides of the liquid crystal mother panel 8, which has been transferred by the holding and transferring mechanism 3, and which juts out from the table 5D.

The guide bar 124 is provided with a scribing mechanism 102 which is used for scribing the front surface of the liquid crystal mother panel 8 and which can be slid in a direction indicated by an arrow X4. The guide bar 125 is provided with a scribing portion 103 which is used for scribing the rear surface of the liquid crystal mother panel 8 and which can be slid in the direction indicated by the arrow X4. The scribing portion 103 is opposed to the scribing portion 102. Motors 113 and 114 for sliding the scribing portions 102 and 103 in the direction indicated by the arrow X4 are attached to the supporting post 122.

FIG. 40 is a front view showing a first and a second cutter wheel chips provided in the scribing portion 102 and 103, respectively. Referring to FIGS. 38 and 40, the scribing portion 102 has a moving member 109 which can be slid in the direction indicated by the arrow X4. A scribing head 111 is provided on the lower surface of the moving member 109 in such a manner that it projects from a side of the guide bar 124 opposite to the table 5D. A chip holder 106 is provided on the lower surface of the scribing head 111. A cutter wheel chip 104 is provided on the lower end of the chip holder 106.

The scribing portion 103 has the same configuration as that of the above-described scribing portion 102, and is provided so as to be opposed to the scribing portion 102. The scribing portion 103 has a moving member 109 which can be slid in the direction indicated by the arrow X4. The scribing head 111 is provided on the upper surface of the moving member 109 in such a manner that it projects a side of the guide bar 124 opposite to the table 5D. A chip holder 107 is provided on the upper surface of the scribing head 112. A cutter wheel chip 105 is provided on the upper end of the chip holder 107.

The cutter wheel chip 104 provided in the scribing portion 102 is deviated from the rotational center 128 of the chip holder 106 in a direction indicated by an arrow 130. The cutter wheel chip 105 provided in the scribing portion 103 is deviated from the rotational center 129 of the chip holder 107 in the direction indicated by the arrow 130.

The type of blades of the cutter wheel chip 104 provided in the scribing portion 102 and the cutter wheel chip 105 provided in the scribing portion 103 varies depending on the type of a subject to be cut. Therefore, different types of liquid crystal mother panels 8 can be cut in a flexible manner.

Figure 41:
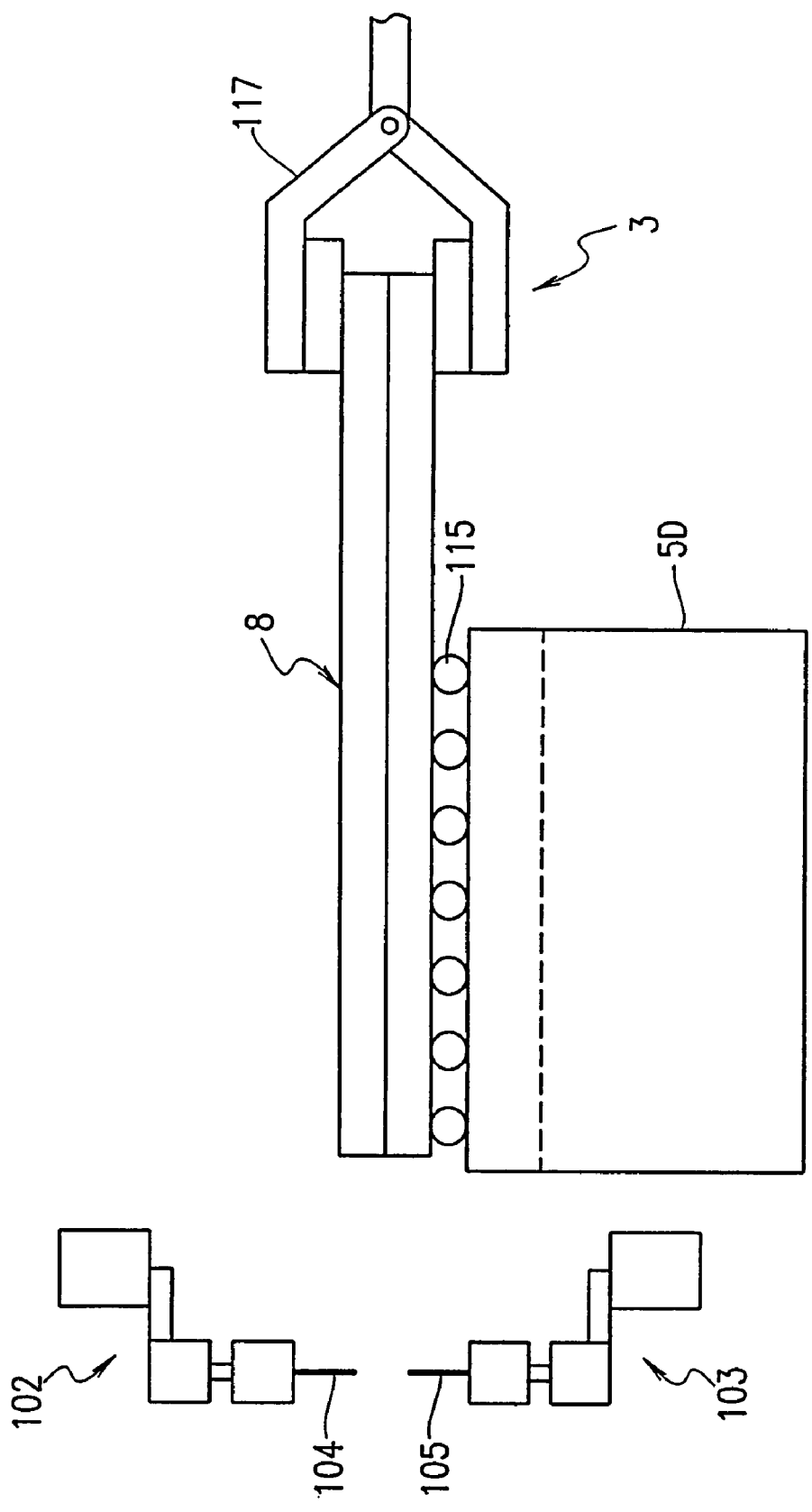
FIGS. 41 through 44 are diagrams for explaining a scribing operation of the glass scriber of Embodiment 3.

The operation of the thus-constructed liquid crystal panel separation apparatus 1D will be described. FIGS. 41 through 44 are diagrams for explaining the operation of the scribing operation of the liquid crystal panel separation apparatus 1D. The liquid crystal mother panel 8 is placed on the table 5D by a suction mechanism (not shown) so that an end of the liquid crystal mother panel 8 juts out from the table 5D on a side thereof opposite to the scribing mechanism 4D. As shown in FIG. 41, a capturing portion 117 provided in the holding and transferring mechanism 3 holds the end of the liquid crystal mother panel 8 jutting out from the table 5D in a grab-like manner. Thereafter, the supporting post 120 provided in the holding and transferring mechanism 3 is moved in a direction indicated by an arrow Y5 toward the scribing mechanism 4D. The capturing portion 117 attached to the supporting post 120 pushes the liquid crystal mother panel 8. The liquid crystal mother panel 8 is transferred on a plurality of rollers 115 provided on the upper surface of the table 5D toward the scribing mechanism 4D. When the transferred liquid crystal mother panel 8 is shifted to a position where the intended scribing line of the liquid crystal mother panel 8 will be located at a position corresponding to the cutter wheel chips 104 and 105 of the respective scribing portions 102 and 103 provided in the scribing mechanism 4D, the movement of the supporting post 120 is stopped.

Figure 42:
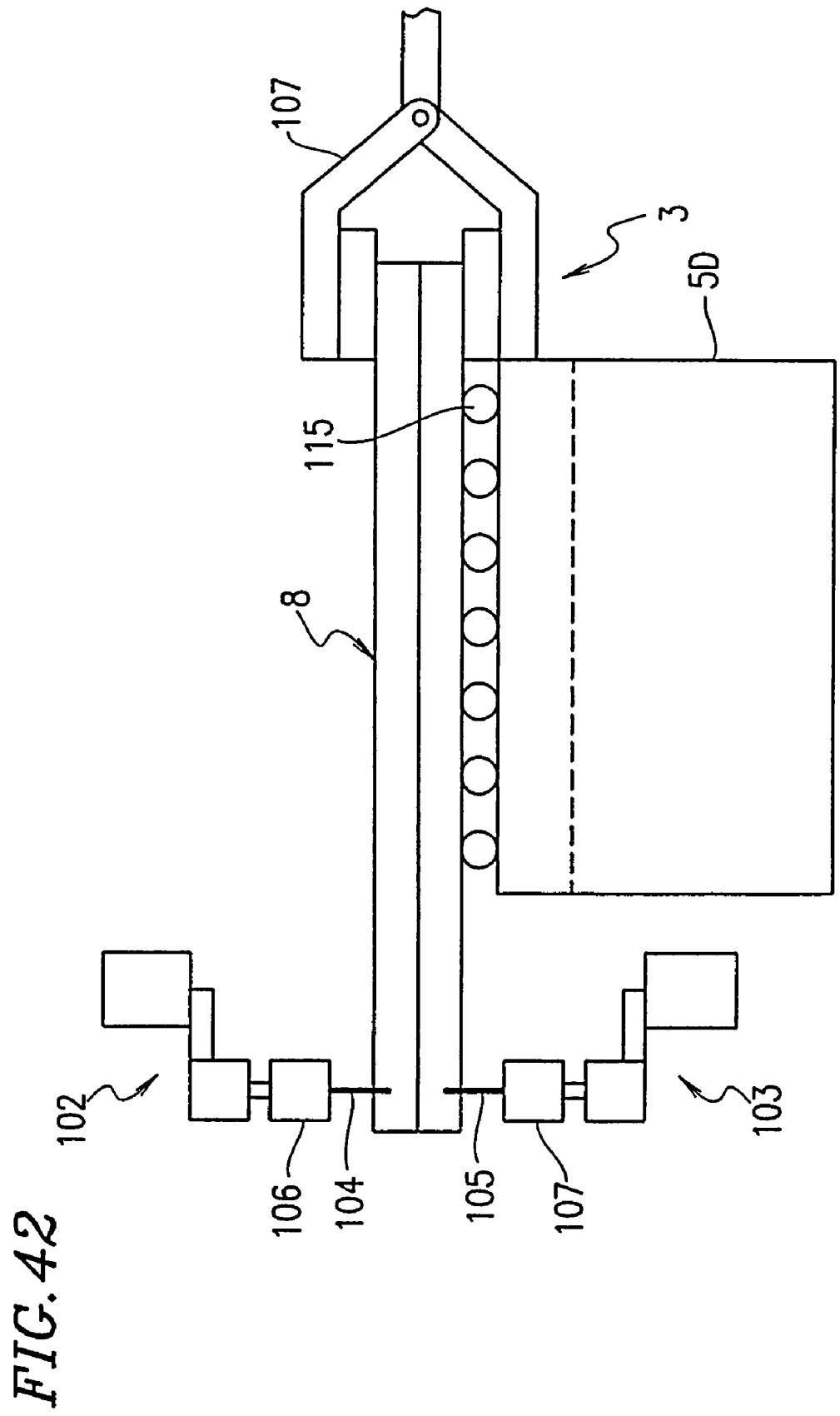

Next, the scribing portion 102 is driven along the guide bar 124 by the motor 113 provided on the supporting post 122 of the scribing mechanism 4D. As shown in FIG. 42, the upper surface of the liquid crystal mother panel 8 is scribed along an intended scribing line by the cutter wheel chip 104 attached to the chip holder 106 provided in the scribing portion 102. The scribing portion 103 is driven by the motor 114 along the guide bar 125. The lower surface of the liquid crystal mother panel 8 is scribed along a scribing line by the cutter wheel chip 105 attached to the chip holder 107 provided in the scribing portion 103 as shown in FIG. 42.

Figure 43:
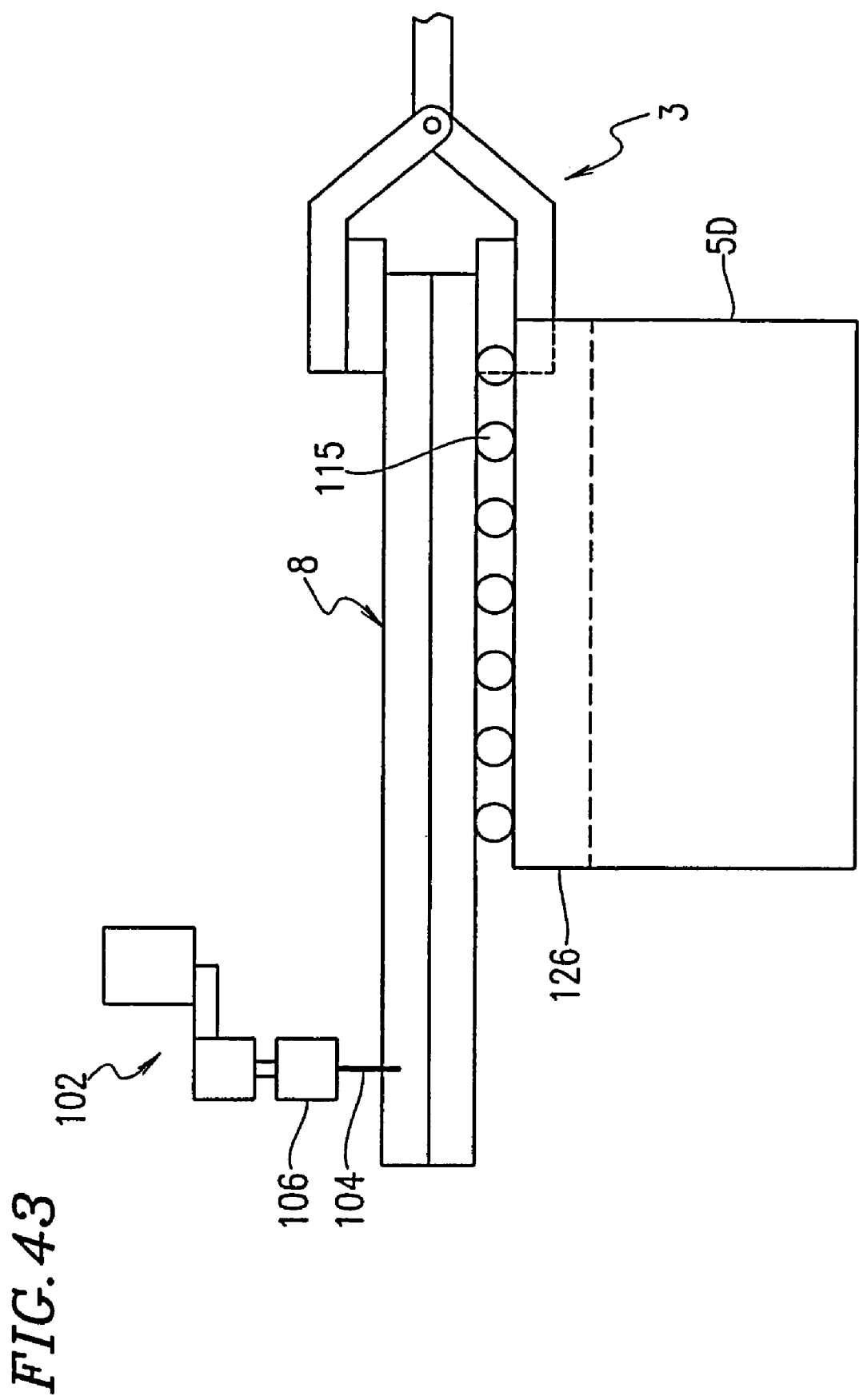

Thereafter, the supporting post 120 provided in the holding and transferring mechanism 3 is further moved toward the scribing mechanism 4D in a direction indicated by the arrow Y5, so that the capturing portion 117 attached to the supporting post 120 further pushes the held liquid crystal mother panel 8 which is in turn proceeded along the capturing portion guiding groove 126 provided on the table 5D as shown in FIG. 43. The liquid crystal mother panel 8 is further transferred on the plurality of rollers 115 provided on the upper surface of the table 5D. When the liquid crystal mother panel 8 is transferred so that another intended scribing line to be provided on the liquid crystal mother panel 8 will be located at a position corresponding to the cutter wheel chip 104 of the scribing portion 102, the movement of the supporting post 120 is stopped again.

Thereafter, the scribing portion 102 is driven along the guide bar 124 by the motor 113 provided on the supporting post 122 of the scribing mechanism 4D. As shown in FIG. 43, the upper surface of the liquid crystal mother panel 8 is scribed along another intended scribing line by the cutter wheel chip 104 attached to the chip holder 106.

Thereafter, the supporting post 120 provided in the holding and transferring mechanism 3 is further moved in the direction indicated by the arrow Y5 toward the scribing mechanism 4D, so that the capturing portion 117 attached to the supporting post 120 pushes the held liquid crystal mother panel 8. When the liquid crystal mother panel 8 is transferred so that another intended scribing line on the liquid crystal mother panel 8 is located at a position corresponding to the cutter wheel chips 104 and 105 of the respective scribing portion 102 and 103, the movement of the supporting post 120 is stopped again.

Figure 44:
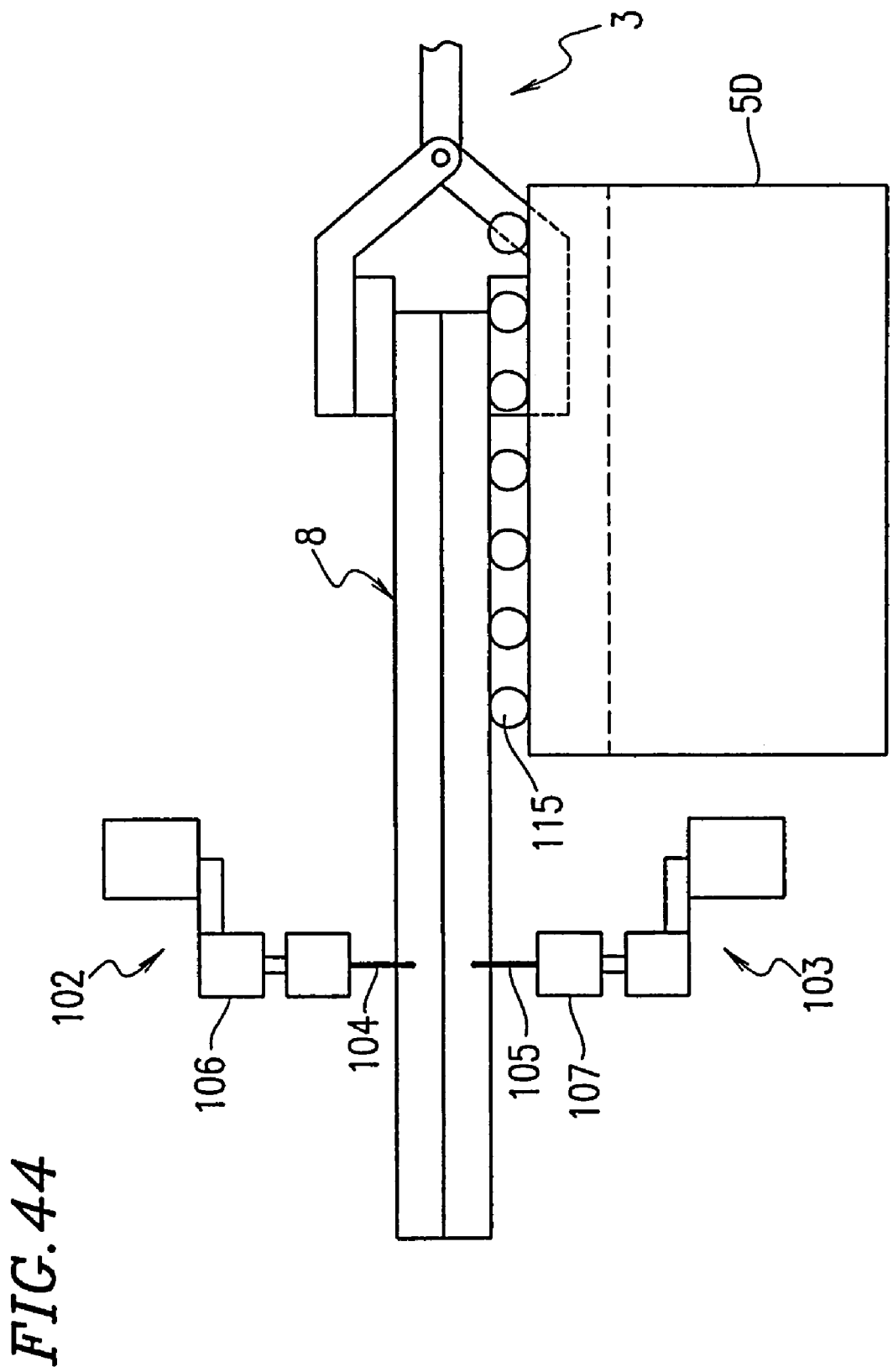
Figure 45:
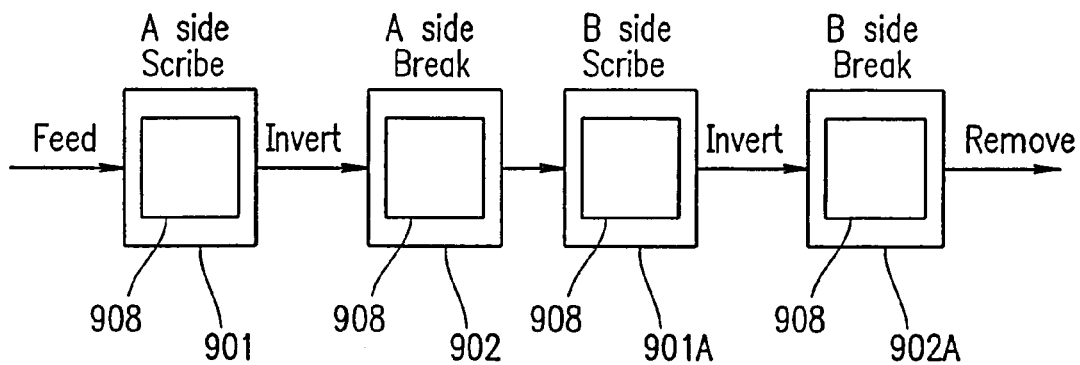
FIG. 45 is a block diagram showing a conventional liquid crystal panel separation production line.
Figure 46:
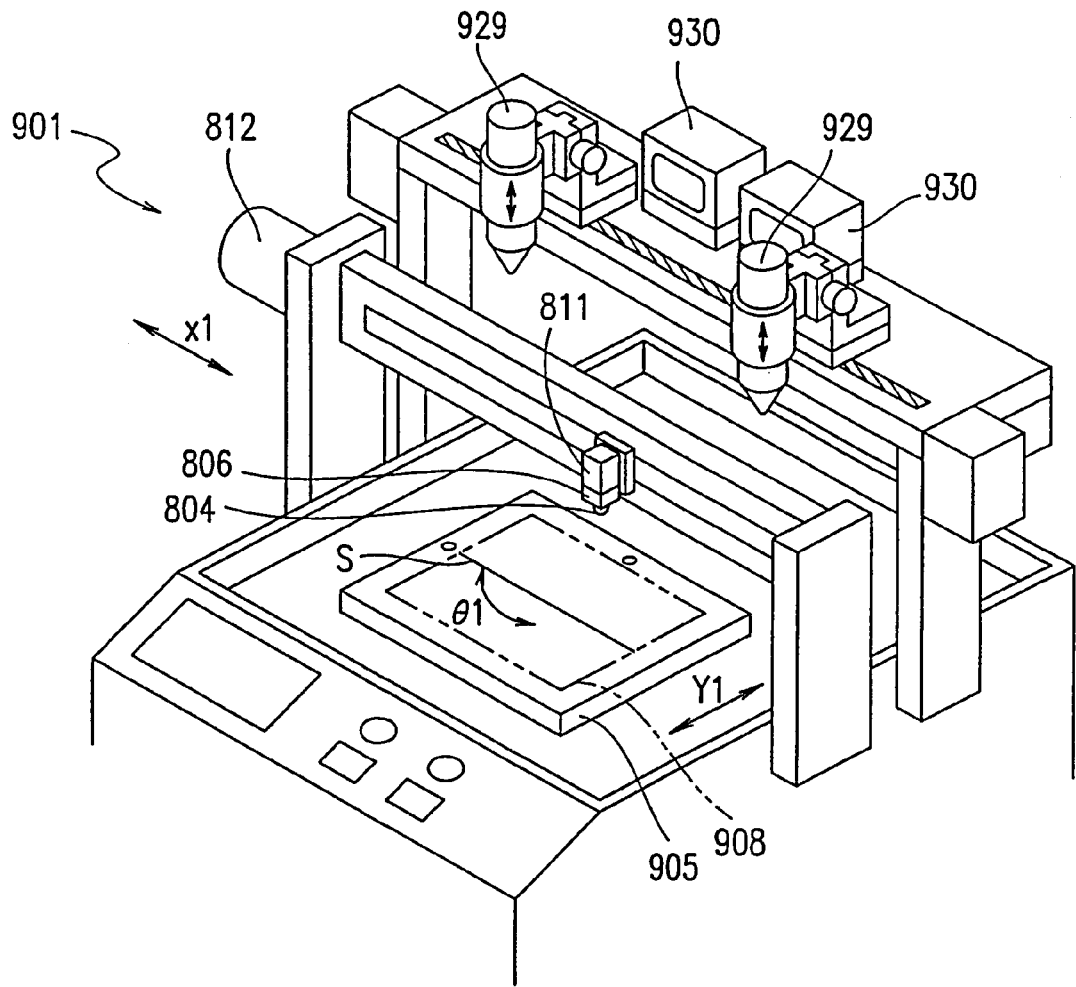
FIG. 46 is a perspective view showing a scribing apparatus of the conventional liquid crystal panel separation production line.
Figure 47:
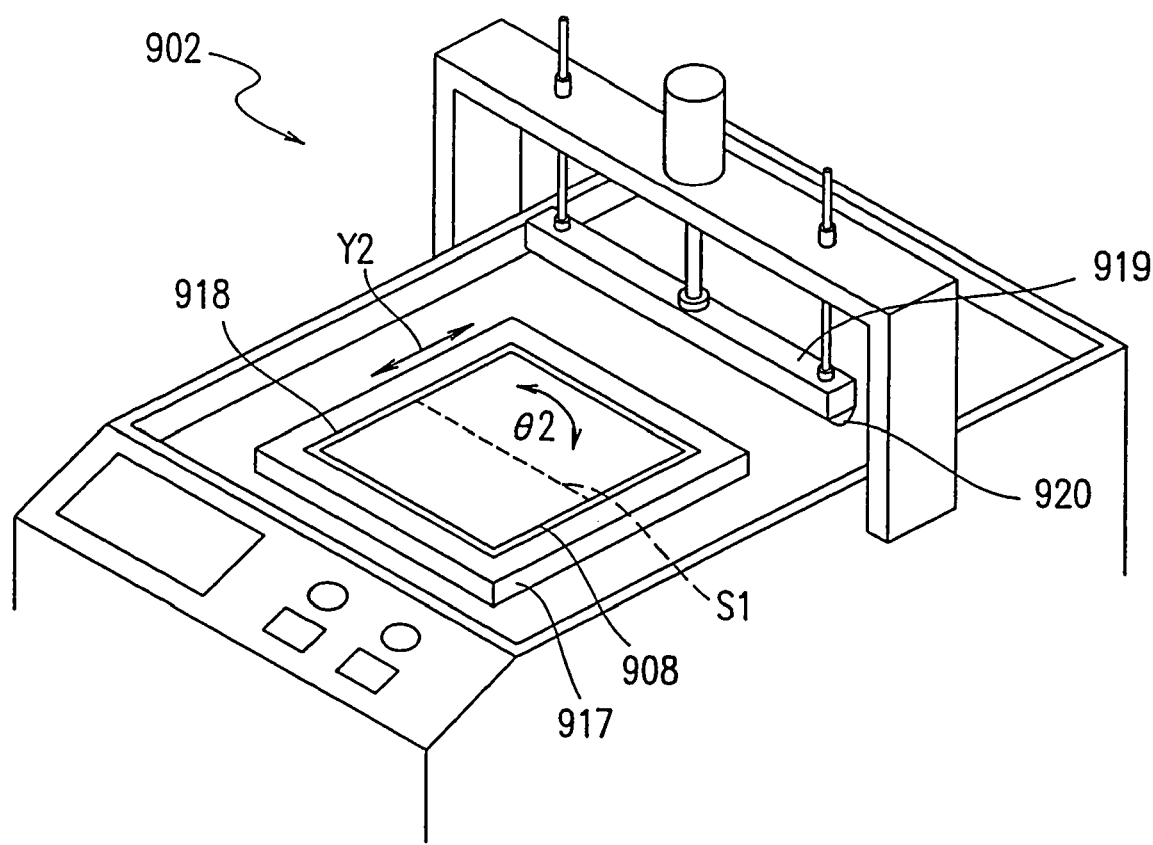
FIG. 47 is a perspective view showing a breaking apparatus of the conventional liquid crystal panel separation production line.
Figure 48:
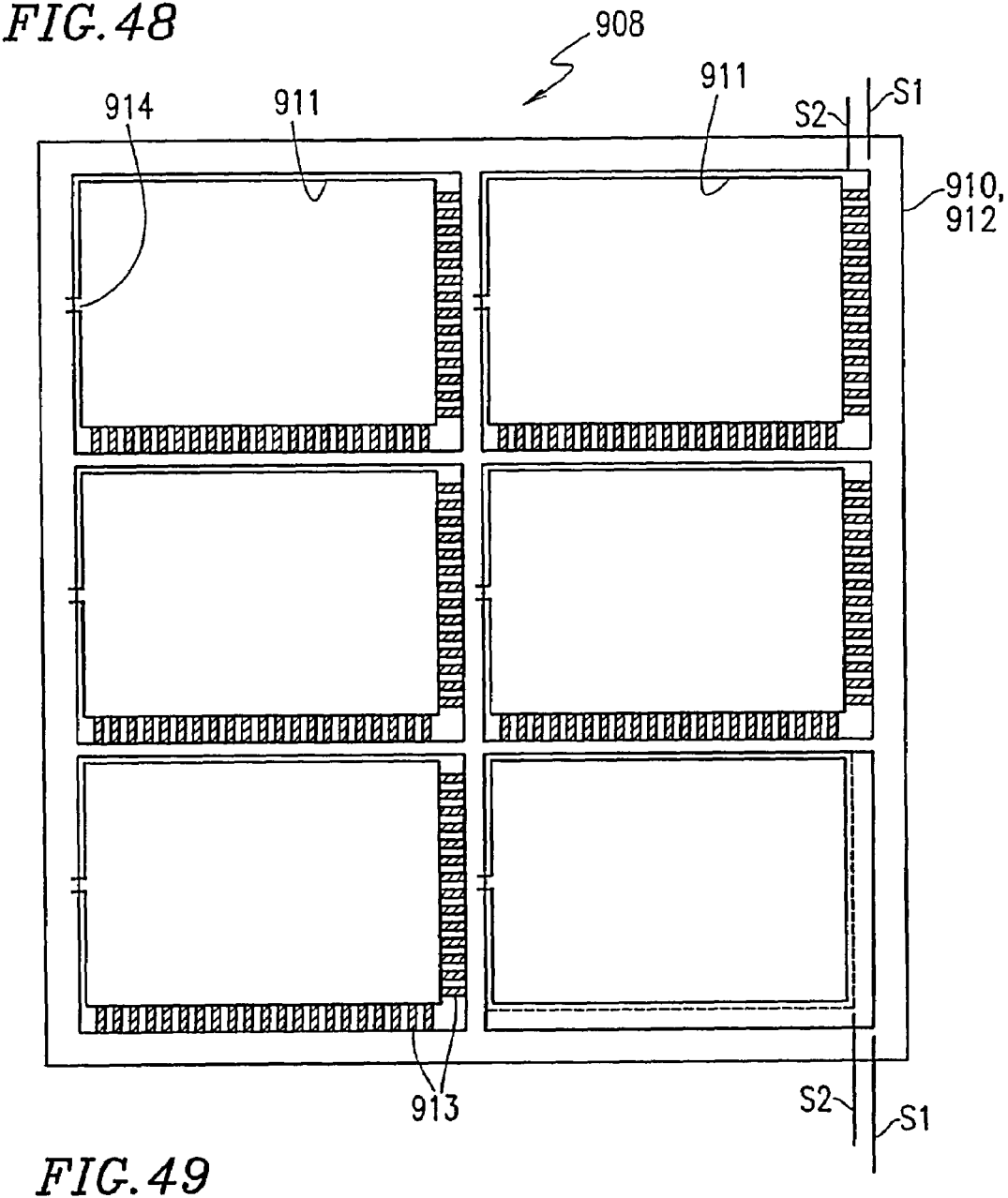
FIG. 48 is a plan view showing a conventional liquid crystal mother panel.
Figure 49:
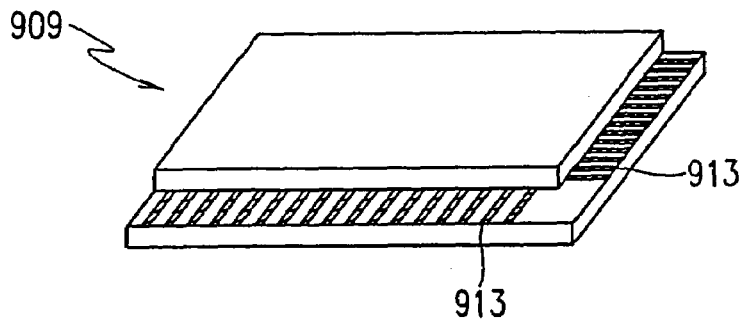
FIG. 49 is a perspective view showing a liquid crystal panel separated from the conventional liquid crystal mother panel.

Next, the scribing portion 102 is driven by the motor 113 along the guide bar 124 as described with reference to FIG. 42. As shown in FIG. 44, the front surface of the liquid crystal mother panel 8 is scribed along the above-described intended scribing line by the cutter wheel chip 104. The scribing portion 103 is driven by the motor 114 along the guide bar 125. As shown in FIG. 44, the rear surface of the liquid crystal mother panel 8 is scribed by the cutter wheel chip 105 along the above-described intended scribing line.

As described above, according to Embodiment 3, the holding and transferring mechanism 3 holds and transfers the liquid crystal mother panel 8 so that the intended scribing line of the liquid crystal mother panel 8 is shifted to a position corresponding to the cutter wheel chips. The liquid crystal mother panel 8 is scribed along the intended scribing line while the liquid crystal mother panel 8 is held by the holding and transferring mechanism 3. Thereafter, the liquid crystal mother panel 8 is then transferred so that another intended scribing line of the liquid crystal mother panel 8 is shifted to a position corresponding to the cutter wheel chips.

Therefore, before and after the liquid crystal mother panel 8 is scribed by the cutter wheel chips, the holding and transferring mechanism 3 is kept holding the liquid crystal mother panel 8. For this reason, before and after the liquid crystal mother panel 8 is scribed by the cutter wheel chips, a step of releasing the liquid crystal mother panel 8 and a step of holding the liquid crystal mother panel 8 again are no longer required. As a result, a tact time required for the step of scribing the liquid crystal mother panel 8 can be reduced.

INDUSTRIAL APPLICABILITY

As described above, according to the present invention, a separation apparatus and a production line having a reduced processing time for separating a mother panel can be provided.

Further, according to the present invention, a separation apparatus and a production line having a small footprint (occupied area) can be provided.

Furthermore, according to the present invention, a separation apparatus and a production line capable of separating a mother panel without requiring the provision of an adhesive seal can be provided.

The invention claimed is:

1. A separation apparatus, comprising:
   first and second scribing means for scribing scribing lines on front and rear surfaces, respectively, of a mother substrate made of a brittle material, the first and second scribing means being opposed to each other and being provided on an upper side and a lower side of the mother substrate, respectively; and
   first and second rollers for separating the mother substrate along the scribing lines provided by the first and second scribing means, the first roller being provided on the upper side of the mother substrate and rolling on the front surface of the mother substrate, the first roller being attached to a first roller attachment which is moveable upward and downward to move the first roller independently of the first scribing means to contact and press the front surface of the mother substrate such that during separating, the first scribing means does not contact the substrate, and the second roller being provided on the lower side of the mother substrate and rolling on the rear surface of the mother substrate, the second roller being attached to a second roller attachment which is moveable upward and downward to move the second roller independently of the second scribing means to contact and press the rear surface of the mother substrate such that during separating, the second scribing means does not contact the substrate, a first supporting member for supporting the first scribing means and first roller, a second supporting member for supporting and second scribing means and second roller, wherein the supporting members are configured to move the scribing means and rollers to a scribing position in which the scribing means contact the substrate, and wherein the roller attachments are movable independently of the supporting members to move the rollers into a separating position in which only the rollers contact the substrate, said supporting members being movable across said mother substrate and being shiftable laterally of the scribing lines to move the scribing means to scribe the mother substrate and to allow the rollers to create a bending force on the scribing lines to separate the mother substrate.

* * * * *